US012162715B2

(12) United States Patent
Fujioka

(10) Patent No.: US 12,162,715 B2
(45) Date of Patent: Dec. 10, 2024

(54) RECORDING DEVICE

(71) Applicant: seiko Epson Corporation, Tokyo (JP)

(72) Inventor: Satoshi Fujioka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 609 days.

(21) Appl. No.: 17/385,567

(22) Filed: Jul. 26, 2021

(65) Prior Publication Data

US 2022/0033207 A1 Feb. 3, 2022

(30) Foreign Application Priority Data

Jul. 28, 2020 (JP) ................................ 2020-127008

(51) Int. Cl.
*B65H 5/08* (2006.01)
*B41J 11/00* (2006.01)
*B65H 5/02* (2006.01)

(52) U.S. Cl.
CPC .............. *B65H 5/08* (2013.01); *B41J 11/007* (2013.01); *B65H 5/021* (2013.01)

(58) Field of Classification Search
CPC ........... B65H 5/08; B65H 5/021; B41J 11/007
See application file for complete search history.

(56) References Cited

U.S. PATENT DOCUMENTS

| | | | |
|---|---|---|---|
| 9,573,393 B2 | 2/2017 | De Roeck | |
| 9,586,421 B2 | 3/2017 | Ito et al. | |
| 10,160,235 B2 | 12/2018 | Tomioka et al. | |
| 2016/0101633 A1* | 4/2016 | De Roeck | B65H 5/224 271/266 |
| 2016/0152051 A1 | 6/2016 | Ito et al. | |
| 2018/0099513 A1* | 4/2018 | Tomioka | B41J 11/007 |
| 2021/0291559 A1* | 9/2021 | Aoki | B41J 11/007 |

FOREIGN PATENT DOCUMENTS

| | | |
|---|---|---|
| CN | 204622855 | 9/2015 |
| CN | 207416324 | 5/2018 |
| EP | 2551121 | 1/2013 |
| EP | 3403834 | 11/2018 |
| JP | 2005-319721 | 11/2005 |
| JP | 2013-028143 | 2/2013 |
| JP | 2015-013455 A | 1/2015 |
| JP | 2018-062084 A | 4/2018 |
| JP | 2018-193199 | 12/2018 |
| JP | 2019-093609 | 6/2019 |

* cited by examiner

*Primary Examiner* — Thomas A Morrison
(74) *Attorney, Agent, or Firm* — WORKMAN NYDEGGER

(57) ABSTRACT

A printer includes a recording head, a belt, a scale unit, a reading head, a gripping unit. The belt includes a first surface configured to support a medium and a second surface opposite to the first surface. The gripping unit includes a first abutting portion that comes into contact with the first surface, and a second abutting portion that comes into contact with the second surface. The gripping unit can be changed between a gripping state of moving along with the glue belt while gripping the glue belt, and a release state of being separated from the glue belt. When the gripping unit is in the release state, the second abutting portion is separated from the second surface in conjunction with the first abutting portion being separated from the first surface.

7 Claims, 20 Drawing Sheets

RECORDING DEVICE

The present application is based on, and claims priority from JP Application Serial Number 2020-127008, filed Jul. 28, 2020, the disclosure of which is hereby incorporated by reference herein in its entirety.

BACKGROUND

1. Technical Field

The present disclosure relates to a recording device.

2. Related Art

A printing apparatus described in JP-A-2018-193199 includes a transporting belt, a scale unit provided in a transport direction, a detector configured to detect a displacement, a gripping portion capable of changing between a gripping state and a non-gripping state with respect to the transporting belt, and a switching unit configured to switch between the gripping state and the non-gripping state of the gripping portion. The gripping portion is configured to be capable of holding the transporting belt between an end portion of a gripping substrate and an end portion of an elastic member by an elastic force of the elastic member.

In the configuration of JP-A-2018-193199, when the gripping portion is set to the non-gripping state and moved in a reverse direction to the transport direction, the end portion of the elastic member separates from the transporting belt, but the end portion of the gripping substrate remains in contact with the transporting belt. As a result, each time the gripping portion is moved in the reverse direction to the transport direction, friction occurs due to contact between the end portion of the gripping substrate and the transporting belt, likely causing a reduction in a durability of the transporting belt.

SUMMARY

In order to solve the problems described above, a recording device according to the present disclosure includes a recording unit configured to perform recording on a medium, a transporting belt including a first surface and a second surface and configured to transport the medium in a transport direction, the first surface being configured to support the medium, the second surface being opposite to the first surface in a thickness direction, a scale unit including a scale and provided in the transport direction, a reading unit configured to read the scale, a gripping portion configured to move integrally with the scale unit or the reading unit, and to change between a gripping state of moving along with the transporting belt while gripping the transporting belt in the thickness direction, and a release state of being separated from the transporting belt, and a return unit configured to move the gripping portion in the release state in a reverse direction to the transport direction. The gripping portion includes a first abutting portion configured to come into contact with the first surface in the gripping state, and a second abutting portion configured to come into contact with the second surface in the gripping state. When the gripping portion is in the release state, the second abutting portion is separated from the second surface in conjunction with the first abutting portion being separated from the first surface.

DESCRIPTION OF EXEMPLARY EMBODIMENTS

Figure 1:
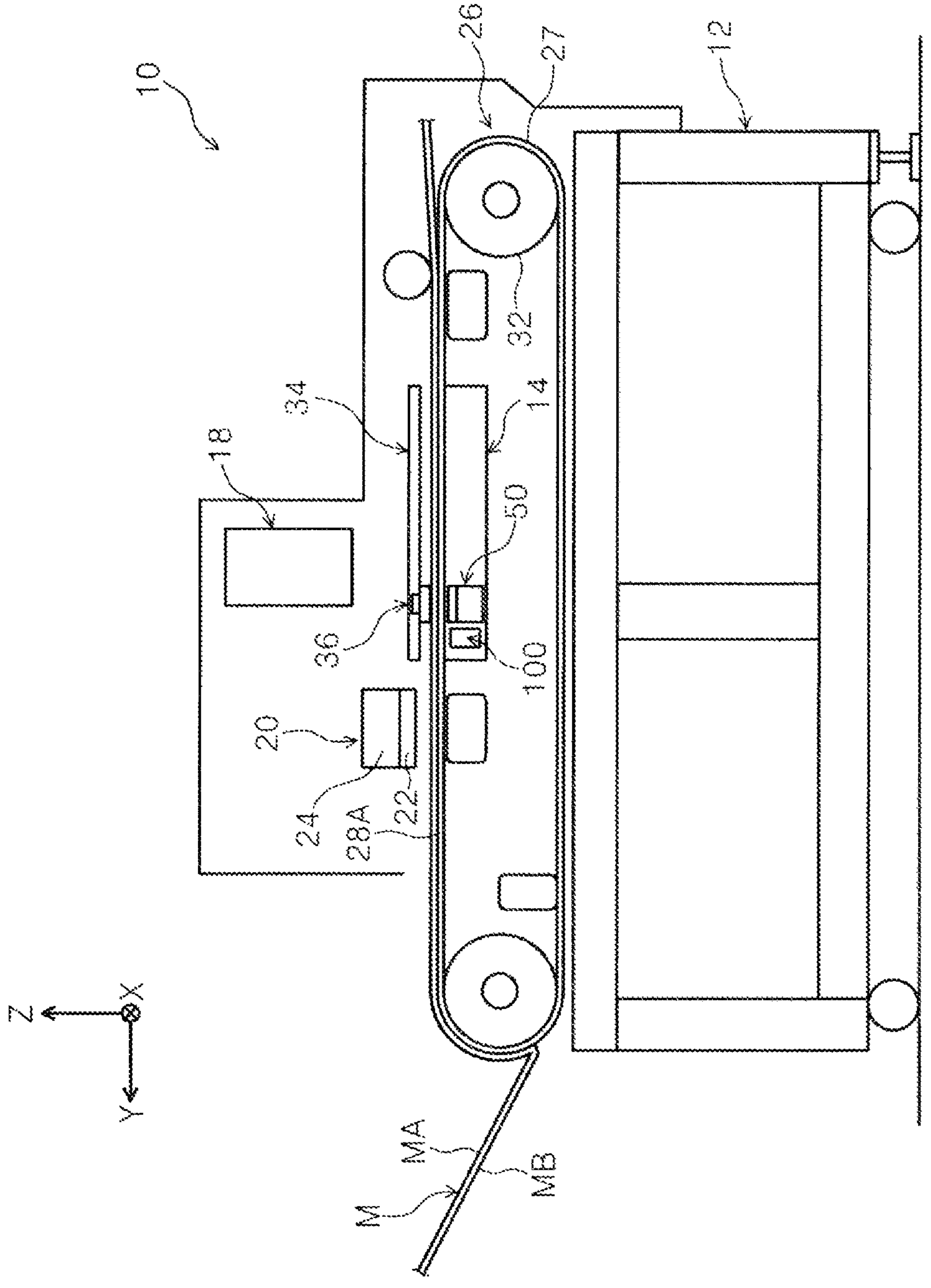
FIG. 1 is an overall view illustrating an internal structure of a printer according to a first exemplary embodiment.

Below, the present disclosure will be schematically described.

A recording device according to a first aspect of the present disclosure for solving the problems described above includes a recording unit configured to perform recording on a medium, a transporting belt including a first surface and a second surface and configured to transport the medium in a transport direction, the first surface being configured to support the medium, the second surface being opposite to the first surface in a thickness direction, a scale unit including a scale and provided in the transport direction, a reading unit configured to read the scale, a gripping portion configured to move integrally with the scale unit or the reading unit, and to change between a gripping state of moving along with the transporting belt while gripping the transporting belt in the thickness direction, and a release state of being separated from the transporting belt, and a return unit configured to move the gripping portion in the release state in a reverse direction to the transport direction. The gripping portion includes a first abutting portion configured to come into contact with the first surface in the gripping state, and a second abutting portion configured to come into contact with the second surface in the gripping state. When the gripping portion is in the release state, the second abutting portion is separated from the second surface in conjunction with the first abutting portion being separated from the first surface.

According to this aspect, the first abutting portion and the second abutting portion are separated from the transporting belt in the release state. Thus, when the gripping portion in the release state is moved in the reverse direction by the return unit, one of the first abutting portion and the second abutting portion remains in contact with the transporting belt and no longer moves in the reverse direction, that is, the occurrence of friction in the transporting belt is suppressed, making it possible to suppress a reduction in durability of the transporting belt.

In a recording device according to a second aspect, in the first aspect, the recording device further includes a switching unit configured to switch the gripping portion between the gripping state and the release state, a first support portion configured to support the first abutting portion, and a second support portion configured to support the second abutting portion. At least one of the first support portion and the second support portion is constituted by a ferromagnetic material. The switching unit includes an electromagnet configured to generate an electromagnetic force when current flows, the switching unit being configured to switch the gripping portion from the release state to the gripping state by the electromagnet attracting at least one of the first support portion and the second support portion.

According to this aspect, in comparison to a configuration in which at least one of the first support portion and the second support portion is pulled via a motor and a link mechanism, a space required for movement of the link mechanism is unnecessary, making it possible to miniaturize the switching unit and the gripping portion.

In a recording device according to a third aspect, in the second aspect, the recording device further includes a coupling portion that includes a main body member to which each of the first support portion and the second support portion is rotatably coupled, and is configured to couple the first support portion and the second support portion. The main body member is provided with a permitting portion configured to permit displacement of the coupling portion with respect to the main body member.

According to this aspect, in comparison to a configuration in which the first support portion and the second support portion are coupled to different members, the first support portion and the second support portion are coupled to the same main body member, and thus a relative assembly error between the first support portion and the second support portion is reduced, making it possible to suppress a relative position shift between the first support portion and the second support portion at the coupling portion.

In a recording device according to a fourth aspect, in the second aspect or the third aspect, at least one of the first support portion and the second support portion includes an attracted portion configured to be attracted by the electromagnet, and the attracted portion is disposed below the electromagnet in a gravitational direction corresponding to a direction of gravity acting on the attracted portion, and is separated from the electromagnet in the gripping state.

According to this aspect, the attracted portion, which is a portion suctioned by the electromagnet, is separated from the electromagnet in the gripping state, making it possible to reduce the magnetization of the second support portion in comparison to a case in which the attracted portion is not separated. Thus, residual magnetization of the second support portion after the current flowing through the electromagnet is cut off is reduced and thus the second support portion is separated from the electromagnet by the action of gravity, making it possible to switch to the release state with a simple configuration.

In a recording device according to a fifth aspect, in any one of the first aspect to the fourth aspect, the scale unit is a magnetic scale with a magnetic pattern recorded as the scale.

According to this aspect, a strength of a magnetic line of force used in the magnetic scale is less likely to be reduced by foreign material such as dust in comparison to a strength of a light beam, making it possible to suppress a reduction in a reading accuracy of the scale by the reading unit when foreign material adheres to the scale unit.

In a recording device according to a sixth aspect, in any one of the first aspect to the fifth aspect, the gripping portion is supported by an adjustment unit configured to adjust a position of the gripping portion in a device height direction intersecting the transport direction.

According to this aspect, the position of the gripping portion in the thickness direction in the gripping state can be adjusted by using the adjustment unit. By this action, even if the transporting belt is bent and the position of the transporting belt is shifted in the thickness direction, the gripping portion can grip the transporting belt.

In a recording device according to a seventh aspect, in any one of the first aspect to the sixth aspect, the recording device further includes a guide member configured to guide the gripping portion in the transport direction, and a driving portion configured to drive the return unit. The gripping portion is brought into the gripping state at a first position in the transport direction, and brought into the release state at a second position downstream of the first position. The return unit is supported by the guide member and configured to be driven by the driving portion in the second position and thus move the gripping portion in the reverse direction.

According to this aspect, in comparison to a case in which the gripping portion includes the driving portion, it is possible to suppress the action of a mechanical load on the gripping portion. Thus, mechanical loads other than a mechanical load of the guide member itself on the gripping portion do not act on the gripping portion, and thus, when the gripping portion in the gripping state moves from the second position to the first position in the reverse direction, the movement of the gripping portion is not inhibited by the mechanical load.

Accordingly, a shift in the position at which the gripping portion grips the transporting belt in the transport direction is suppressed, making it possible to suppress a reduction in the detection accuracy of the displacement of the transporting belt caused by the gripping portion.

In a recording device according to an eighth aspect, in the seventh aspect, when the gripping portion is positioned in the second position, the return unit is separated from and positioned downstream of the gripping portion in the transport direction, and at least one of the return unit and the gripping portion is provided with an buffer member configured to buffer an impact force generated by contact between the return unit and the gripping portion.

According to this aspect, when the return unit moves the gripping portion in the reverse direction, an impact force acting on the gripping portion can be bufferd by the buffer member in comparison to a case in which the return unit comes into direct contact with the gripping portion. Thus, failures in operation of the gripping portion can be suppressed.

In a recording device according to ninth aspect, in any one of the first aspect to the eighth aspect, the recording device further includes a limiting portion configured to come into contact with the gripping portion and thus limit a movement range of the gripping portion in the transport direction, and at least one of the gripping portion and the limiting portion is provided with another buffer member configured to buffer an impact force generated by contact between the gripping portion and the limiting portion. According to this aspect, in comparison to a case in which the gripping portion comes into direct contact with the limiting portion, an impact force applied to the gripping portion can be bufferd by the other buffer member. Thus, failures in operation of the gripping portion can be suppressed.

Hereinafter, a printer 10 of a first exemplary embodiment serving as an example of the recording device according to the present disclosure will be described in detail.

FIG. 1 illustrates an overall configuration of the printer 10. The printer 10 is configured as an ink-jet type device configured to perform recording by ejecting ink, which is an example of a liquid, on a fiber M serving as an example of a medium. Note that an X-Y-Z coordinate system illustrated in each drawing is an orthogonal coordinate system. Note that, of the fiber M, a surface on which the recording is performed by a recording unit 20 is referred to as a recorded surface MA, and a surface opposite to the recorded surface MA is referred to as a back surface MB.

An X direction is a width direction of the fiber M and a width direction of the printer 10, and is, as an example, a horizontal direction. A direction toward the left in the X direction as viewed by an operator of the printer 10 is referred to as a +X direction, and a direction toward the right is referred to as a −X direction.

A Y direction is a transport direction of the fiber M supported by a flat surface 28A described later and a depth direction of the printer 10, and is, as an example, a horizontal direction. The transport direction in which the fiber M is transported is referred to as a +Y direction, and a direction opposite to the +Y direction is referred to as a −Y direction.

A Z direction is an example of a device height direction of the printer 10, and is a vertical direction. A direction upward in the Z direction is referred to as a +Z direction, and a direction downward is referred to as a −Z direction. The −Z direction is an example of a gravitational direction, which is the direction in which gravity acts.

First Exemplary Embodiment

Figure 3:
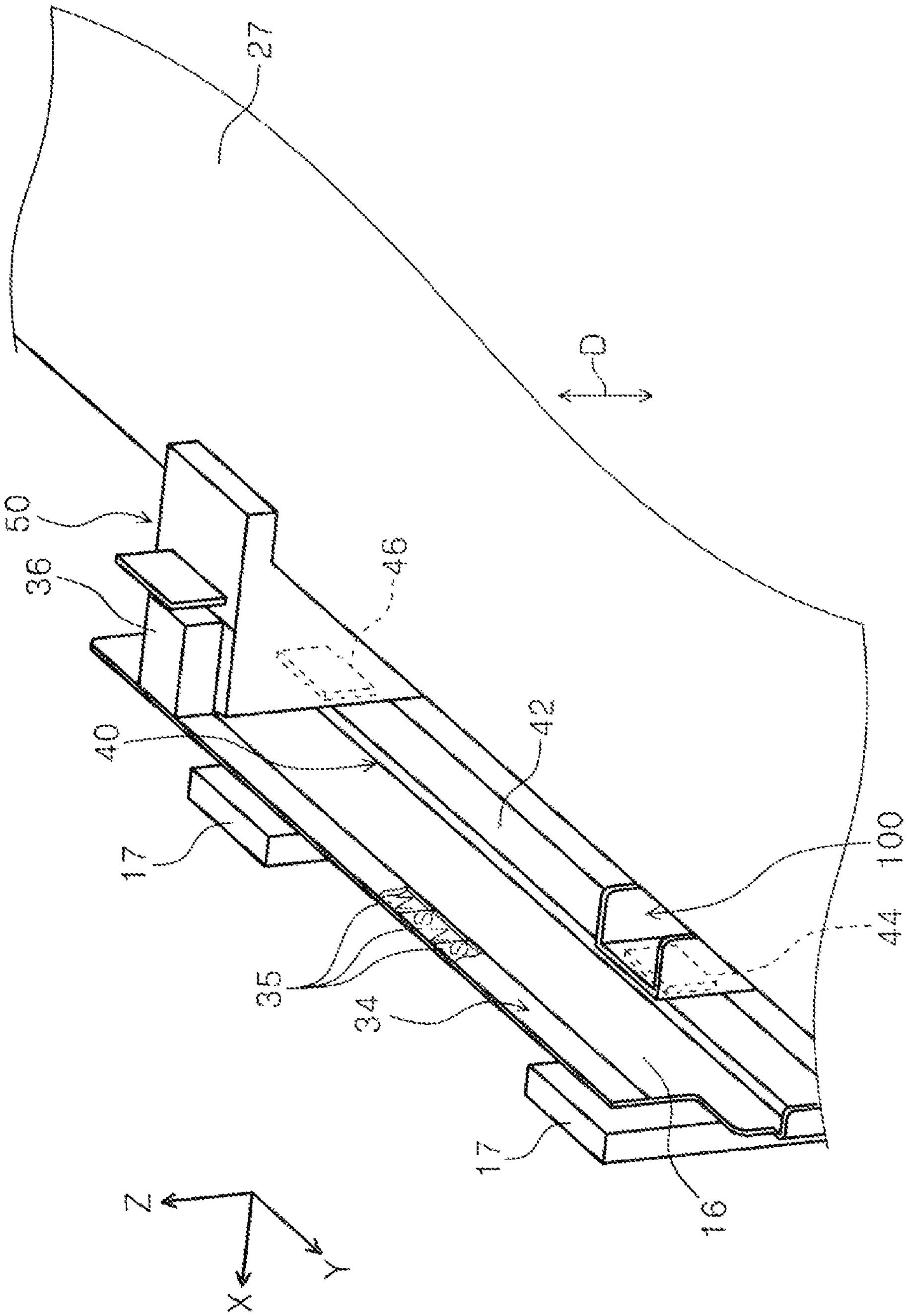
FIG. 3 is a perspective view of a glue belt, a gripping unit, and a return unit of the first exemplary embodiment.
Figure 4:
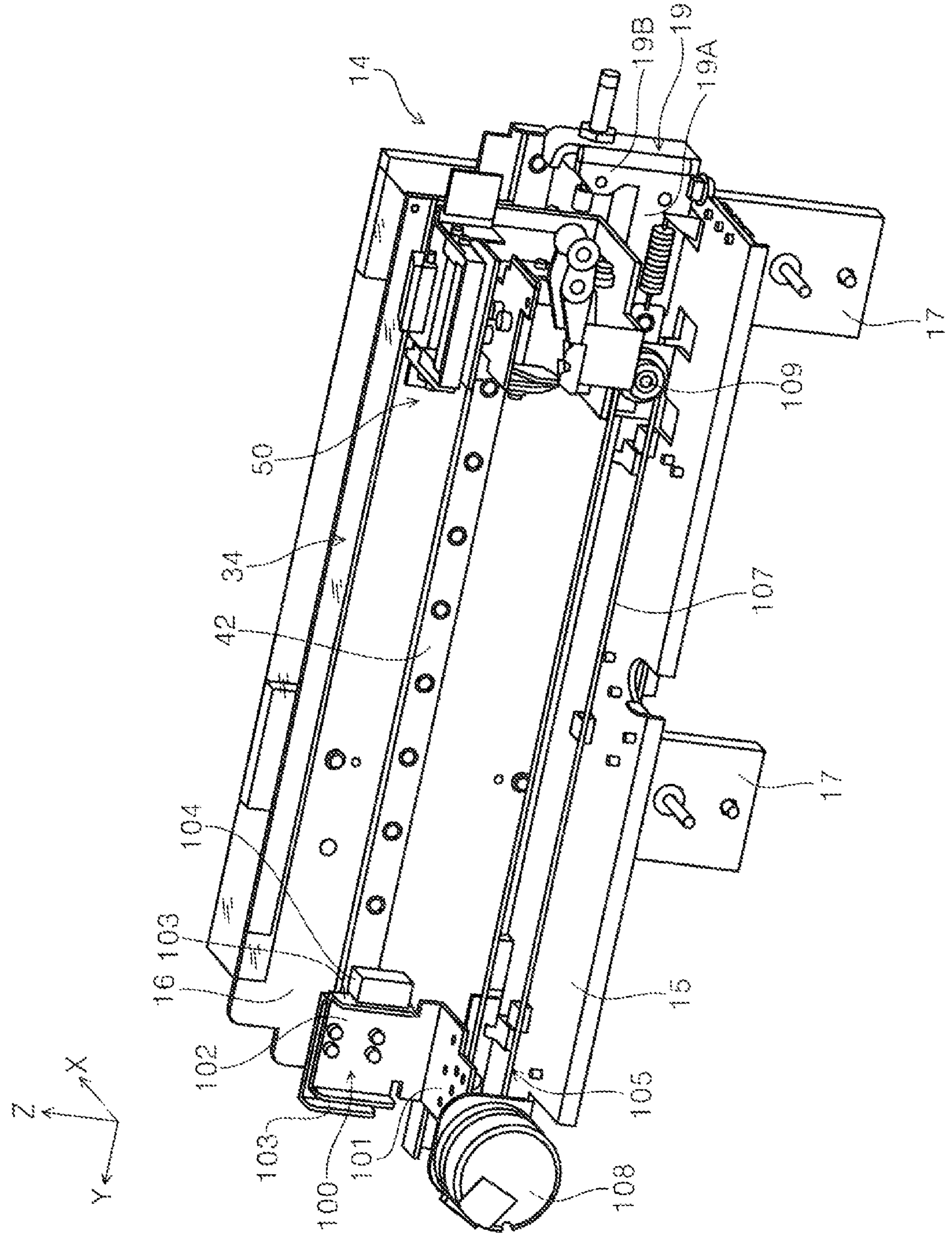
FIG. 4 is a perspective view of the gripping unit and the return unit of the first exemplary embodiment.

The printer 10 includes, as main components, the recording unit 20, a transporting unit 26, a scale unit 34, a reading head 36, a guide unit 40 (FIG. 3), a gripping unit 50, a return carriage 100, and a motor 108 (FIG. 4). Furthermore, the printer 10 includes a main body frame 12, a drawing unit (not illustrated), and a control unit 18. The main body frame 12 is configured as a base on which components of the printer 10 are provided. A supporting frame 14 is attached to the main body frame 12 symmetrically in the +X direction and the −X direction with respect to a center of the main body frame 12 in the X direction. The supporting frame 14 is disposed in the +X direction and the −X direction with respect to a glue belt 27 described later.

As illustrated in FIG. 4, the supporting frame 14 includes, as an example, a base plate portion 15, a side plate portion 16, and a supporting plate 17. Further, the supporting frame 14 is provided with a stopper 19. A length of the supporting frame 14 in the Y direction is shorter than a length from a driven roller 32 to the recording unit 20 (FIG. 1) described later in the Y direction. Note that description will be made of the supporting frame 14 on the +X direction side, and description of the supporting frame 14 on the −X direction side will be omitted.

The base plate portion 15 has a predetermined thickness in the Z direction and extends in the Y direction.

The side plate portion 16 stands upright in the +Z direction from an end portion of the base plate portion 15 on the +X direction side. Further, the side plate portion 16 has a predetermined thickness in the X direction and is disposed along the Y-Z plane.

In this exemplary embodiment, two supporting plates 17 are provided. The supporting plate 17 has, as an example, a predetermined thickness in the X direction and extends in the Z direction. Further, the two supporting plates 17 are attached to a side surface of the side plate portion 16 on the +X direction side at an interval in the Y direction. The supporting plate 17 is formed with a plurality of through holes (not illustrated) passing through the supporting plate 17 in the X direction and disposed at an interval in the Z direction. A bolt inserted through any of these plurality of through holes is fastened to the main body frame 12 (FIG. 1) to adjust a height of the supporting plate 17 in the +Z direction.

In other words, the supporting frame 14 is an example of an adjustment unit, and is capable of adjusting a position of the gripping unit 50 in the Z direction. Further, the supporting frame 14 supports the gripping unit 50.

The stopper 19 is a member formed in an L-shape when viewed from the X direction, and includes a horizontal portion 19A and a vertical portion 19B.

The horizontal portion 19A extends in the Y direction and is fixed by being fastened to an end portion of the base plate portion 15 on the −Y direction side using screws (not illustrated) or the like.

The vertical portion 19B stands upright in the +Z direction from an end portion of the horizontal portion 19A on the −Y direction side. Further, the vertical portion 19B is disposed contactable with the gripping unit 50 described later in the Y direction.

The stopper 19 is an example of a limiting portion and comes into contact with the gripping unit 50 and thus limits a movement range of the gripping unit 50 in the Y direction.

In the printer 10 illustrated in FIG. 1, the drawing unit (not illustrated) by which the fiber M wound in a roll shape is supported is provided in the −Y direction with respect to the transporting unit 26. The fiber M is drawn from the drawing unit.

The control unit 18 includes a central processing unit (CPU), a read only memory (ROM), a random access memory (RAM), and storage (each not illustrated). Further, the control unit 18 controls the transport of the fiber M in the printer 10, the recording operation onto the fiber M by the recording unit 20, and the like.

The recording unit 20 includes a recording head 22 and a carriage 24. The recording head 22 is an example of a recording unit, and can perform recording onto the recorded surface MA by ejecting ink onto the recorded surface MA. The carriage 24 is provided movable in the X direction, and movably supports the recording head 22 in the X direction.

Figure 2:
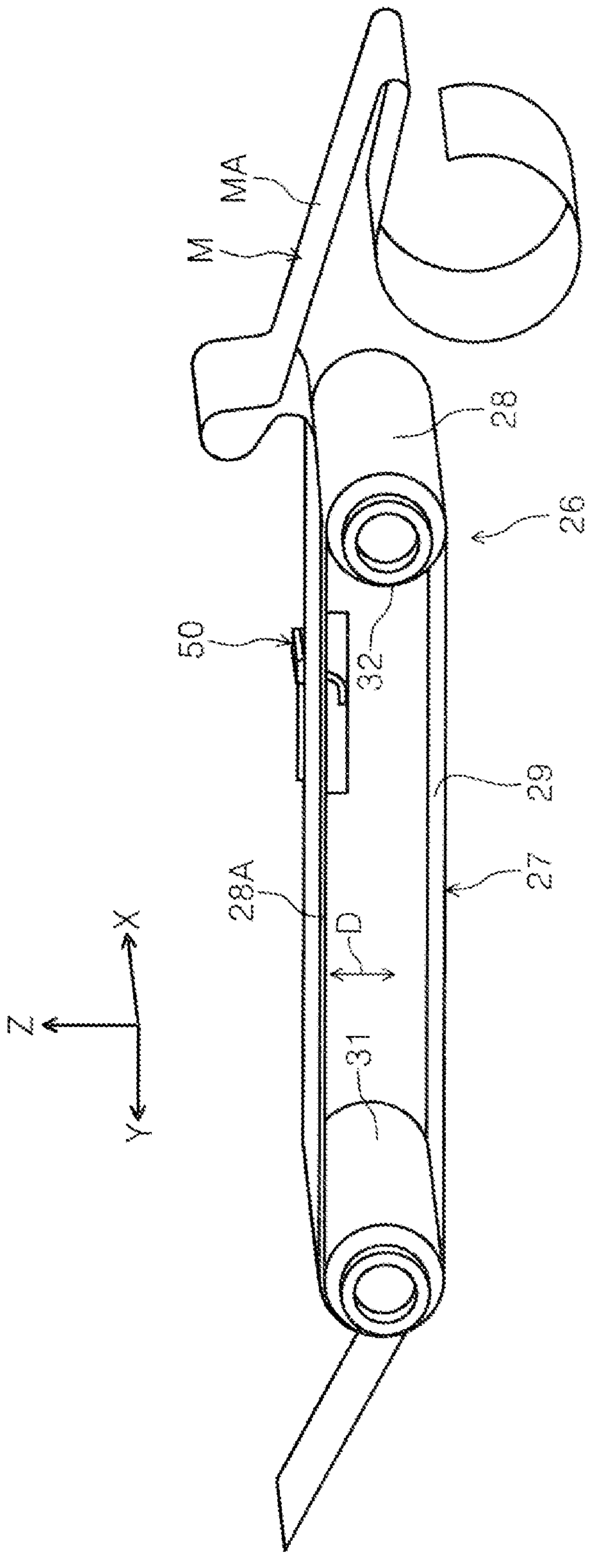
FIG. 2 is a perspective view illustrating a state in which a medium is transported by a transporting unit of the first exemplary embodiment.

As illustrated in FIG. 2, the transporting unit 26 includes the glue belt 27 as one example of a transporting belt, a driving roller 31 having a rotation controlled by the control unit 18 (FIG. 1), and the driven roller 32 rotated as the glue belt 27 is moved. The driving roller 31 is rotated by a motor (not illustrated).

The glue belt 27 is configured as an endless belt. A thickness direction of the glue belt 27 is referred to as a D direction. Further, the glue belt 27 includes a first surface 28 that supports the fiber M, and a second surface 29 opposite to the first surface 28 in the D direction.

The first surface 28 is an outer circumferential surface, has adhesiveness, and is capable of adsorbing the fiber M. The term adhesiveness refers to a property that allows another member to be temporarily adhered and peeled from an adhered state. An area of the first surface 28 positioned in the +Z direction and along the X-Y plane is referred to as the flat surface 28A. The flat surface 28A is disposed in the +Z direction and supports the fiber M. Note that, when the glue belt 27 is configured by applying an adhesive to the first surface 28, an outermost layer of the adhesive functions as the flat surface 28A that supports the fiber M.

The driving roller 31 and the driven roller 32 are disposed separated upstream and downstream in the +Y direction. The glue belt 27 is stretched around the driving roller 31 and the driven roller 32. The rotation of the driving roller 31 causes a portion of the glue belt 27 to move in the +Y direction, thereby transporting the fiber M in the +Y direction. Note that, in the transporting unit 26, a transport velocity of the fiber M is variable by adjusting the number of rotations per unit time of the driving roller 31.

Thus, the glue belt 27 can transport the fiber M in the +Y direction toward the recording unit 20 (FIG. 1).

As illustrated in FIG. 3, the scale unit 34 is an example of a scale unit and, as one example of a scale, includes a plurality of magnets 35. That is, the scale unit 34 is formed as a magnetic scale in which magnetic patterns of the north pole and the south pole are alternately arranged in the Y direction as a scale. The entire scale unit 34 is formed in a plate shape having a predetermined thickness in the X direction.

Further, the scale unit 34 is provided in the +Y direction, one at each of a side surface on the −X direction side of the side plate portion 16 on the +X direction side and a side surface on the +X direction side of the side plate portion 16 on the −X direction side. A length of the scale unit 34 in the X direction is greater than or equal to a length of the movement range of the reading head 36 described later in the +Y direction.

Note that the scale unit 34 on the +X direction side and the scale unit 34 on the −X direction side are configured in the same manner and disposed symmetrically with respect to a center of the printer 10 in the X direction. Therefore, in the following description, the scale unit 34 on the +X direction side will be described, and description of the scale unit 34 on the −X direction side will be omitted.

The reading head 36 is an example of a reading unit and is attached to the gripping unit 50 described later. Further, the reading head 36 includes two detection heads (not illustrated) and is formed in a rectangular parallelepiped shape. The two detection heads are arranged in the Y direction and face the scale unit 34 in the X direction. Specifically, the reading head 36 is disposed with a phase thereof shifted by 90° with respect to a pitch of the magnetic striped pattern recorded on the scale unit 34. An electrical signal obtained by the reading head 36 is transmitted to a signal processing circuit (not illustrated), converted to positional information of the reading head 36, and transmitted to the control unit 18 (FIG. 1). Thus, the reading head 36 is configured to be capable of reading the magnets 35. Then, when the gripping unit 50 moves in the +Y direction, the reading head 36 is capable of detecting a movement distance of the gripping unit 50 from a movement start position in the +Y direction, and a stop position of the gripping unit 50 in the +Y direction. Note that the movement start position of the gripping unit 50 is a first position described later. As the reading head 36, for example, a hole element or a tunneling magnetoresistive (TMR) element is used.

The guide unit 40 individually guides the gripping unit 50 and the return carriage 100 in the Y direction. Specifically, the guide unit 40 includes a guide rail 42, a slide block 44, and a slide block 46.

The guide rail 42 is attached to the side surface of the side plate portion 16 on the −X direction side. Further, the guide rail 42 extends in the Y direction.

The slide block 44 is supported by the guide rail 42 and capable of moving in the Y direction along the guide rail 42. Further, the slide block 44 is disposed with a position of an end portion of the guide rail 42 on the +Y direction side as an origin position of the return carriage 100.

The slide block 46 is supported by the guide rail 42 and capable of moving in the Y direction along the guide rail 42. Further, the slide block 46 is disposed with a position of an end portion of the guide rail 42 on the −Y direction side as an origin position of the gripping unit 50.

The guide rail 42 and the slide block 46 are an example of a guide member and guide the gripping unit 50 in the +Y direction. Note that the slide block 44 is also included in the example of the guide member.

The gripping unit 50 is movable in the Y direction integrally with the reading head 36 by the slide block 46 being moved along the guide rail 42. Further, the gripping unit 50 is configured to be changeable between a gripping state of moving along with the glue belt 27 while gripping the glue belt 27 in the D direction, and a release state of being separated from the glue belt 27. Note that the gripping unit 50 does not include a drive source. Therefore, the gripping unit 50 is stationary except when moved along with the movement of the glue belt 27 and when moved along with the movement of the return carriage 100 in the gripping state.

Figure 5:
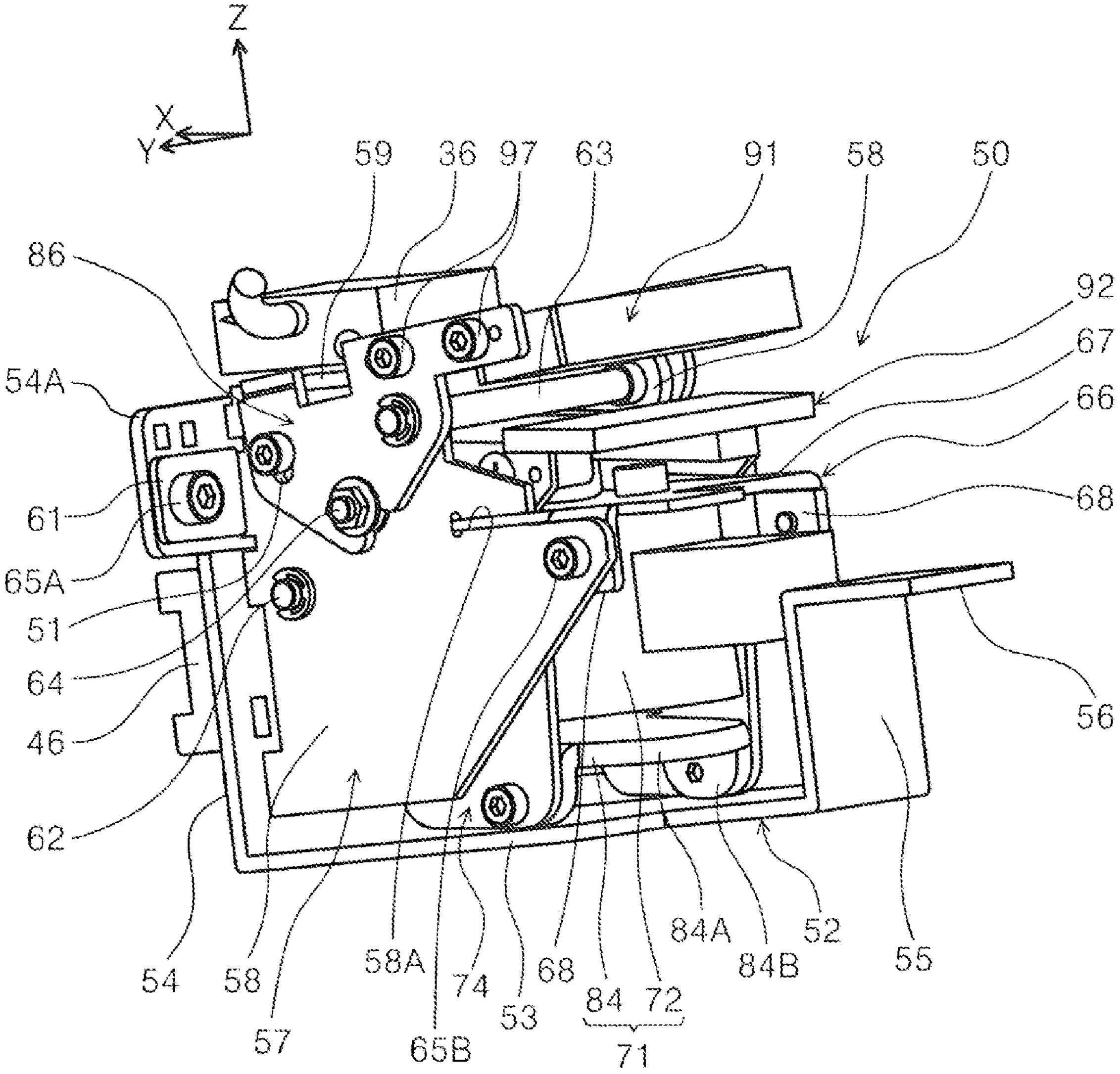
FIG. 5 is a perspective view illustrating a non-gripping state of the gripping unit of the first exemplary embodiment.
Figure 9:
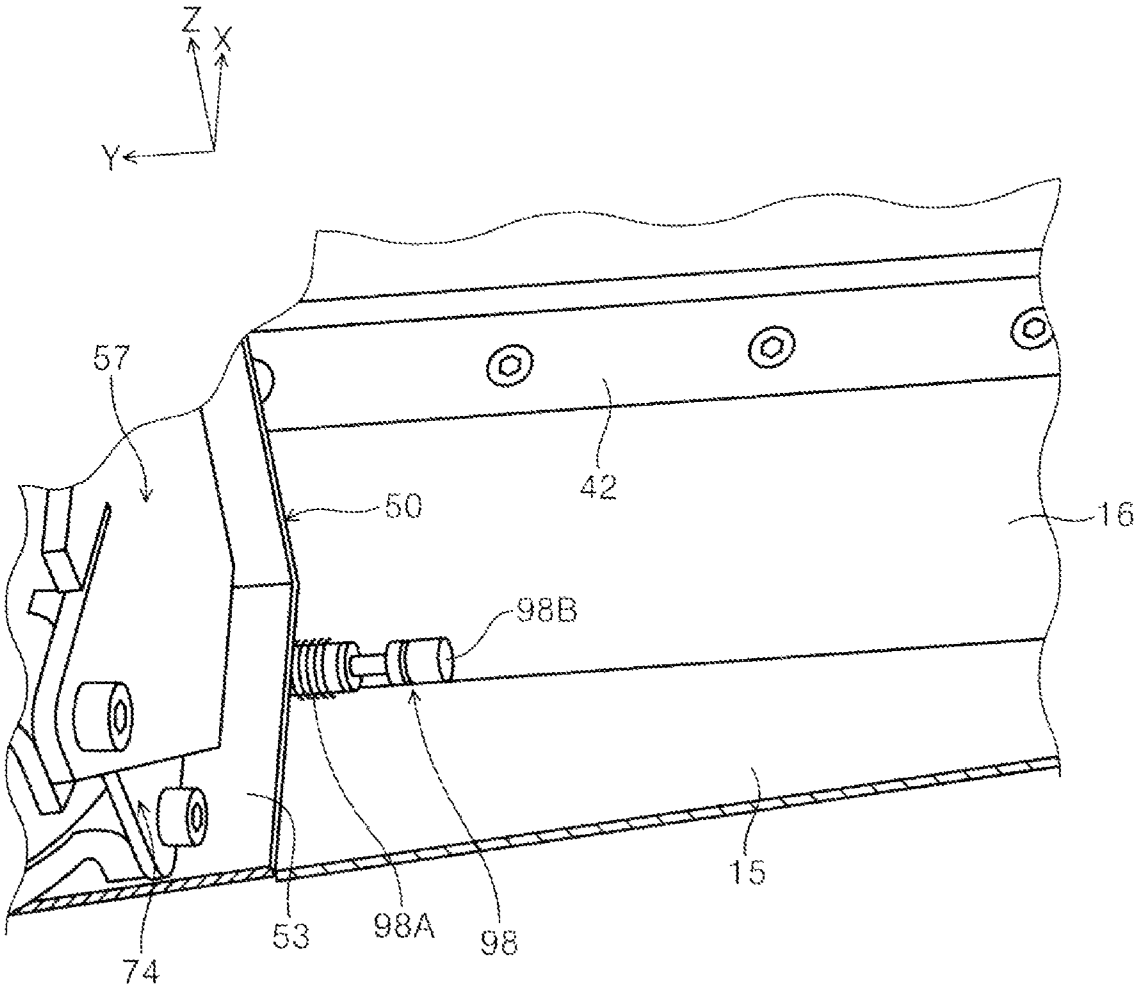
FIG. 9 is a perspective view illustrating a shock absorber of the first exemplary embodiment.

As illustrated in FIG. 5, the gripping unit 50 includes a supporting bracket 52, a mounting frame 57, a fixing frame 66, a switching unit 71, a lower lever 74, an armature 84, an upper lever 86, a first abutting portion 91, and a second abutting portion 92. Further, the gripping unit 50 is provided with a shock absorber 98 (FIG. 9).

The supporting bracket 52 includes a bottom wall 53 along the X-Y plane, a vertical wall 54 that stands upright in the +Z direction at an end portion of the bottom wall 53 on the +X direction side, a vertical wall 55 that stands upright in the +Z direction at an end portion of the bottom wall 53 on the −X direction side, and a flange 56 extending in the −X direction from an end portion of the vertical wall 55 on the +Z direction side.

The vertical wall 54 includes, at the end portion on the +Z direction side, a widened portion 54A widened in the Y direction in comparison to other areas in the Z direction. The slide block 44 is attached to a side surface of the vertical wall 54 on the +X direction side.

A height of the vertical wall 55 in the +Z direction is lower than a height of the vertical wall 54 in the +Z direction.

The mounting frame 57 is an example of a main body member to which the upper lever 86 and the lower lever 74 described later are each rotatably coupled. Further, the mounting frame 57 includes a side plate portion 58, an upper plate portion 59, and an attached portion 61.

In this exemplary embodiment, two side plate portions 58 are provided. The two side plate portions 58 have a predetermined thickness in the Y direction and are disposed at an interval in the Y direction. The side plate portion 58 has an outer shape in which a rectangular area having a dimension in the Z direction longer than a dimension in the X direction and a triangular area having an apex in the −X direction are integrated when viewed from the Y direction. A notch portion 58A notched in the +X direction is formed on an end portion of the side plate portion 58 on the −X direction side.

Figure 6:
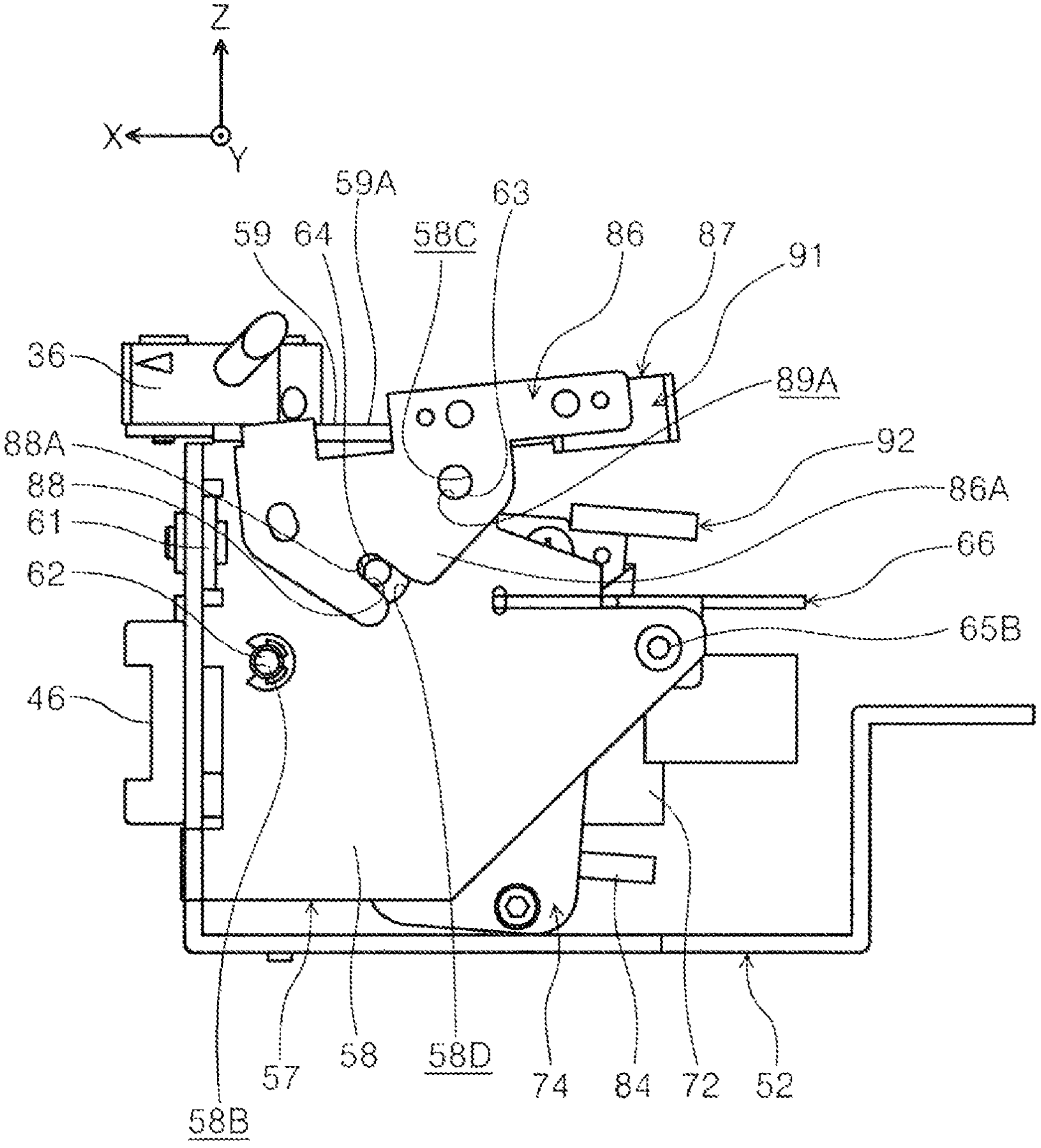
FIG. 6 is a side view of the gripping unit of the first exemplary embodiment.

As illustrated in FIG. 6, a through hole 58B having a circular shape and passing through the side plate portion 58 in the Y direction is formed in a central portion in the Z direction and at an end portion on the +X direction side of the side plate portion 58. A through hole 58C having a circular shape and passing through the side plate portion 58 in the Y direction is formed in an area on the +Z direction side and at the end portion on the −X direction side of the side plate portion 58. Furthermore, an elongated hole 58D passing through the side plate portion 58 in the Y direction is formed in an area of the side plate portion 58 between the through hole 58B and the through hole 58C. Note that the elongated hole 58D being formed in the side plate portion 58 is an example of a permitting portion being provided in the side plate portion 58.

A first shaft 62 is inserted into the through hole 58B. A second shaft 63 is inserted into the through hole 58C.

A link shaft 64 is inserted through the elongated hole 58D. The elongated hole 58D is an example of a permitting portion and permits displacement of the link shaft 64 relative to the mounting frame 57.

The first shaft 62 is formed in a cylindrical shape having a central axis in the Y direction, and couples the two side plate portions 58 in the Y direction. Further, the first shaft 62 serves as a rotation-supporting shaft of the lower lever 74 described later.

The second shaft 63 is formed in a cylindrical shape having a central axis in the Y direction, and couples the two side plate portions 58 in the Y direction. Further, the second shaft 63 serves as a rotation-supporting shaft of the upper lever 86 described later.

The link shaft 64 is formed in a cylindrical shape having a central axis in the Y direction, and couples the two upper levers 86 in the Y direction. Further, the link shaft 64 is disposed inside the elongated hole 58D with positions in the X direction and the Z direction freely changeable. In other words, the link shaft 64 is movable in the longitudinal direction of the elongated hole 58D. Both ends of the link shaft 64 in the Y direction are fastened to the upper levers 86. Furthermore, the link shaft 64 can be brought into contact with a recessed portion 88 described later and thus linked with the upper lever 86 and the lower lever 74. In other words, the link shaft 64 is an example of a coupling portion and couples the upper lever 86 and the lower lever 74.

The upper plate portion 59 couples end portions of the two side plate portions 58 on the +Z direction side in the Y direction. Further, the upper plate portion 59 has a predetermined thickness in the Z direction. The reading head 36 is attached to an upper surface 59A of the upper plate portion 59 on the +Z direction side.

As illustrated in FIG. 5, the attached portion 61 protrudes in the +Y direction or the −Y direction from, of the end portions of the side plate portions 58 on the +X direction side, the end portions on the +Z direction side. Further, the attached portion 61 is fixed to the widened portion 54A by fastening a bolt 65A.

The fixing frame 66 includes a plate portion 67 having a predetermined thickness in the Z direction and a protruding portion 68 protruding from the plate portion 67 in the −Z direction by a portion of the plate portion 67 being bent. Portions of both end portions of the plate portion 67 in the Y direction are inserted into the notch portions 58A. The protruding portion 68 is fixed to the side plate portion 58 by fastening a bolt 65B. Thus, the mounting frame 57 and the fixing frame 66 are integrated with the supporting bracket 52.

Figure 7:
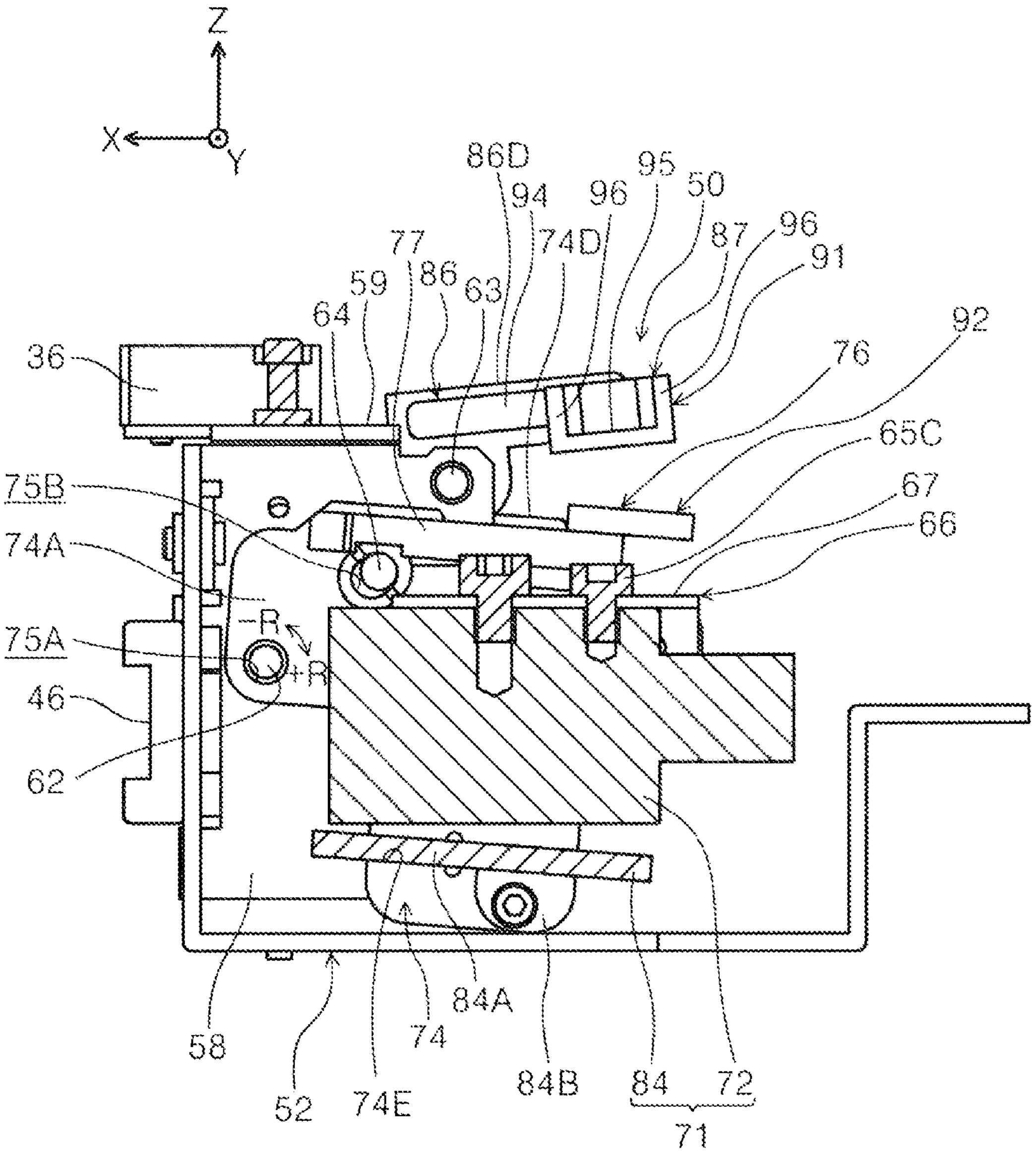
FIG. 7 is a perspective view illustrating an internal structure of the gripping unit of the first exemplary embodiment.

As illustrated in FIG. 7, the switching unit 71 includes, as one example of an electromagnet, an electromagnet 72. The electromagnet 72 is disposed in the −Z direction with respect to the plate portion 67, and fixed to the plate portion 67 by fastening a bolt 65C. Further, the electromagnet 72 is coupled to a power source (not illustrated) via a cable. Then, the electromagnet 72 generates an electromagnetic force due to the flow of current from the power source. In other words, the electromagnet 72 generates a magnetic field.

The switching unit 71 brings the gripping unit 50 into the gripping state by causing a current to flow to the electromagnet 72 and the armature 84 of the lower lever 74 to thus be attracted in the +Z direction by the electromagnetic force. Further, the switching unit 71 brings the gripping unit 50 into the release state by cutting off the current flowing to the electromagnet 72 and thus causing the armature 84 to lower in the −Z direction under its own weight. In this way, the switching unit 71 switches the gripping unit 50 between the gripping state and the release state.

Figure 8:
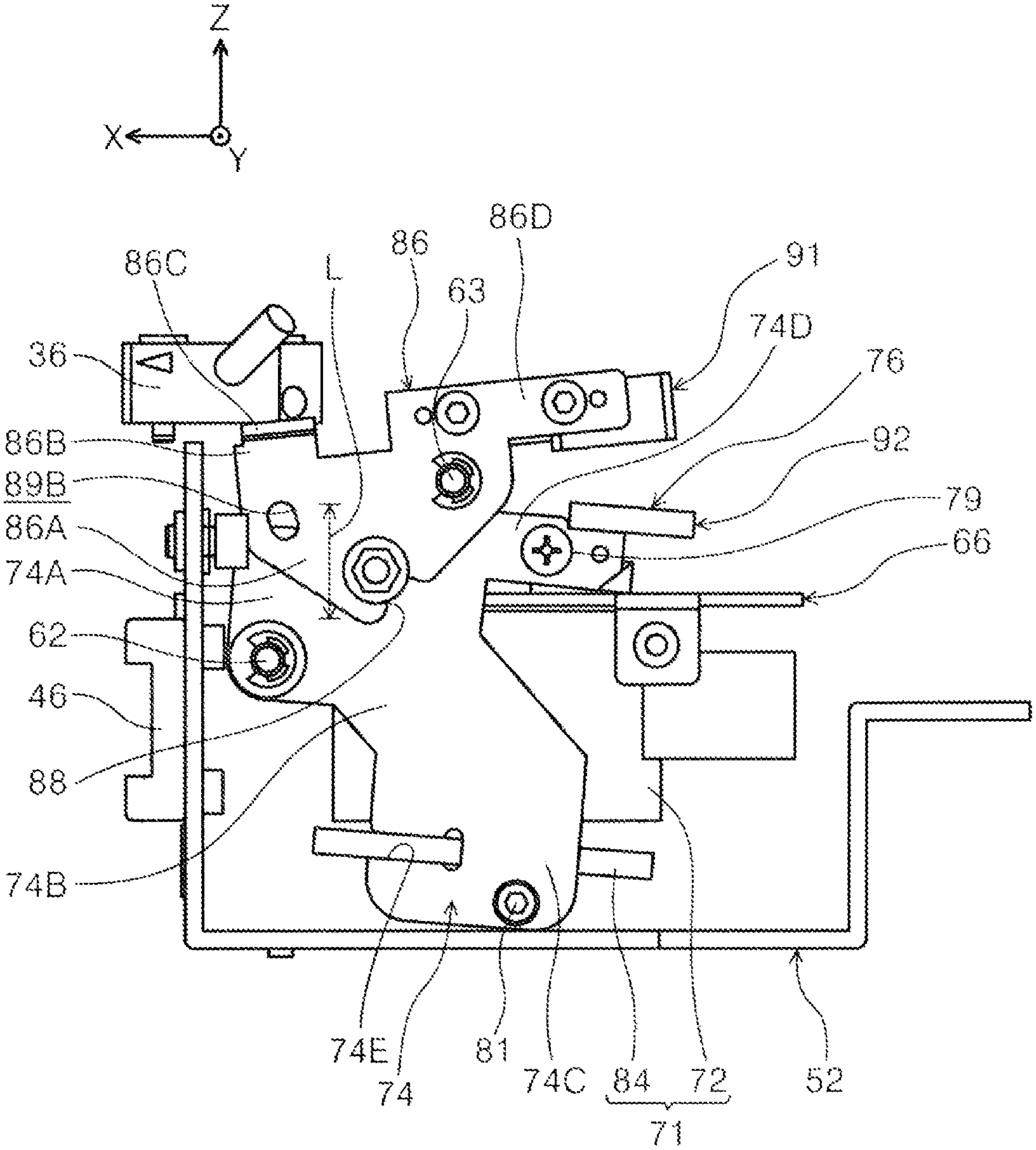
FIG. 8 is a perspective view illustrating a state in which a mounting frame of the gripping unit of the first exemplary embodiment is removed.

As illustrated in FIG. 8, the lower lever 74 is an example of a second support portion that supports the second abutting portion 92. Further, the lower lever 74 is constituted by a ferromagnetic material and is formed in a plate shape having a predetermined thickness in the Y direction. In this exemplary embodiment, a ferromagnetic material means a metal that includes at least one of iron, cobalt, and nickel.

The lower levers 74 are disposed in the −Y direction and the +Y direction with respect to the electromagnet 72. The two lower levers 74 are coupled by the first shaft 62, the upper member 76, and the armature 84. Specifically, the lower lever 74 includes a base portion 74A, an inclined portion 74B, a lower portion 74C, and an extended portion 74D.

As illustrated in FIG. 7, the base portion 74A is an area disposed between the two side plate portions 58 in the Y direction. Further, a through hole 75A passing through the base portion 74A is formed in an area corresponding to an end portion on the +X direction side and an end portion on the −Z direction side of the base portion 74A.

The second shaft 63 is inserted through the through hole 75A. Furthermore, in the base portion 74A, a through hole 75B passing through the base portion 74A is formed in an area positioned on the −X direction side and the +Z direction side with respect to the through hole 75A.

The link shaft 64 is inserted through the through hole 75B. Further, as an example, the through hole 75B is formed as an elongated hole elongated in an oblique direction intersecting the Z direction when viewed from the Y direction.

As illustrated in FIG. 8, the inclined portion 74B extends obliquely downward from the base portion 74A.

The lower portion 74C extends in the −Z direction from an end portion of the inclined portion 74B on the −Z direction side. An end portion of the lower portion 74C on the +X direction is formed with a notched portion 74E notched toward the −X direction side.

The extended portion 74D extends in the −X direction from, among end portions of the base portion 74A on the −X direction side, the end portion on the −Z direction side.

As illustrated in FIG. 7, an upper member 76 includes an attachment portion 77 having a plate shape and a predetermined thickness in the Z direction, and the second abutting portion 92 extending in the −X direction from an upper end portion on the +Z direction side of an end of the attachment portion 77 on the −X direction side. Further, the upper member 76 is fastened to the extended portion 74D by a screw 79 (FIG. 8).

The second abutting portion 92 is constituted by a metal material and formed in a plate shape having a predetermined thickness in the Z direction. When viewed from the Z direction, the second abutting portion 92 is formed in a rectangular shape having a dimension in the Y direction that is longer than a dimension in the X direction. Further, the second abutting portion 92 is disposed at a position in the −X direction and the +Z direction with respect to the lower lever 74 when viewed from the Y direction. The second abutting portion 92 comes into contact with the second surface 29 (FIG. 2) in the gripping state of the gripping unit 50.

The armature 84 is an example of an attracted portion attracted by the electromagnet 72, and is a member constituted by a metal material and has magnetic properties. Further, the armature 84 includes, as an example, a main body portion 84A having a predetermined thickness in the Z direction, and an attachment portion 84B bent in the −Z direction from both end portions of the main body portion 84A in the Y direction.

Portions of both end portions of the armature 84 in the Y direction are inserted into the notch portions 74E. Then, the armature 84 is attached to the lower levers 74 by fastening bolts 81 (FIG. 8) to the attachment portion 84B and the lower levers 74.

The armature 84 is disposed in the −Z direction with respect to the electromagnet 72. The main body portion 84A of the armature 84 faces the electromagnet 72 in the Z direction. In this way, when a magnetic field is generated in the electromagnet 72, the armature 84 is attracted by the magnetic field of the electromagnet 72 and moves toward the electromagnet 72. In other words, the lower levers 74 are rotated about the second shaft 63 when a magnetic field is generated in the electromagnet 72.

Further, the armature 84 is separated from the electromagnet 72 in the gripping state of the gripping unit 50. Specifically, the armature 84 is attracted by the magnetic field of the electromagnetic 72 and thus moves toward the electromagnet 72. Here, when the first abutting portion 91 and the second abutting portion 92 grip the glue belt 27 (FIG. 1), the rotation of the lower levers 74 is stopped by a reaction force received by the second abutting portion 92 from the glue belt 27. At this time, in the Z direction, the armature 84 is disposed forming a gap between the main body portion 84A and the electromagnet 72.

When the lower lever 74 is viewed in the −Y direction, a clockwise direction is a +R direction and a counterclockwise direction is a −R direction. When a magnetic field is generated in the electromagnetic magnet 72, the lower levers 74 are rotated in the −R direction. When the lower levers 74 are each rotated in the −R direction, a hole wall of the through hole 75B comes into contact with an outer circumferential surface of the link shaft 64, moving the link shaft 64 in the +Z direction.

As illustrated in FIG. 6, the upper lever 86 is an example of a first support portion that supports the first abutting portion 91 described later. Further, the upper lever 86 is formed in a plate shape having a predetermined thickness in the Y direction. Specifically, the upper levers 86 are disposed on the +Y direction side with respect to the side plate portion 58 on the +Y direction side and the −Y direction side with respect to the side plate portion 58 on the −Y direction side. In other words, the two upper levers 86 are positioned outward in the Y direction with respect to the mounting frame 57. The two upper levers 86 are coupled by the second shaft 63 and a connection member 87.

As illustrated in FIG. 8, the upper lever 86 includes a base portion 86A, a vertical portion 86B, a flange portion 86C, and an extended portion 86D.

When projected in the Y direction, the base portion 86A overlaps the lower lever 74 in a range of a length L in the Z direction. A lower portion of the base portion 86A positioned in the Z direction with respect to a center in the Z direction is formed in an inverted triangular shape. The lower portion of the base portion 86A is formed with a recessed portion 88.

Further, in the base portion 86A, a through hole 89A (FIG. 6) passing through the base portion 86A in the Y direction is formed at a position on the −X direction side and the +Z direction side with respect to the recessed portion 88. An end portion of the second shaft 63 in the Y direction is inserted into the through hole 89A.

Furthermore, in the base portion 86A, a through hole 89B passing through the base portion 86A in the Y direction is formed at a position on the +X direction side and the +Z direction side with respect to the recessed portion 88. A hole wall of the through hole 89B and a bolt 51 (FIG. 5) fastened to the side plate portion 58 come into contact with each other, limiting a rotational range of the upper lever 86 to a predetermined range.

The vertical portion 86B stands upright in the +Z direction from an end portion on the +X direction side of an end portion of the base portion 86A on the +Z direction side.

The flange portion 86C is attracted in the +Y direction from an end portion of the vertical portion 86B on the +Z direction side.

The extended portion 86D extends in the −X direction from an end portion on the −X direction side of the end portion of the base portion 86A on the +Z direction side.

As illustrated in FIG. 6, the recessed portion 88 is recessed obliquely upward from an outer edge portion of the base portion 86A. Specifically, the recessed portion 88 is recessed toward a position on the +X direction side and the +Z direction side. A curved surface 88A is formed in an area positioned deepest in the recessed portion 88. Further, a portion of the link shaft 64 in the Y direction is inserted into the recessed portion 88. Note that the recessed portion 88 is disposed so as to come into contact with the outer circumferential surface of the link shaft 64 even when the lower lever 74 is rotated in either the +R direction or the −R direction. In other words, the upper lever 86 is linkable with the lower lever 74. Further, after the link shaft 64 is moved along the recessed portions 88 with the first abutting portion 91 and the second abutting portion 92 gripping the glue belt 27, both ends of the link shaft 64 in the Y direction are fastened to the upper levers 86, making it possible to adjust rotation angles of the upper levers 86 and the lower levers

74. Thus, the gripping force when the first abutting portion 91 and the second abutting portion 92 grip the glue belt 27 can be adjusted.

As illustrated in FIG. 7, the connection member 87 includes the first abutting portion 91 extending in the Y direction, and an attachment portion 94 extending in the +X direction from the first abutting portion 91.

The first abutting portion 91 is constituted by a metal material and includes a bottom wall 95 having a plate shape and a predetermined thickness in the Z direction, and two vertical walls 96 that stand upright in the +Z direction from both end portions of the bottom wall 95 in the X direction. The bottom wall 95 is formed in a rectangular shape having a dimension in the Y direction that is longer than a dimension in the X direction. Further, the bottom wall 95 protrudes further in the −Z direction than the extended portion 86D.

The attachment portion 94 is formed in a plate shape having a predetermined thickness in the Y direction, and fixed to the extended portion 86D using a bolt 97 (FIG. 5).

The first abutting portion 91, in the gripping state of the gripping unit 50, comes into contact with the first surface 28 (FIG. 2).

As described above, in the gripping unit 50, the upper levers 86 and the lower levers 74 are linkable. Thus, in the gripping unit 50, when the gripping unit 50 is in the release state, the second abutting portion 92 is separated from the second surface 29 (FIG. 2) in conjunction with the first abutting portion 91 being separated from the first surface 28.

As illustrated in FIG. 4, in a state in which the gripping unit 50 faces an end portion of the supporting frame 14 on the −Y direction side, the position of the gripping unit 50 in the +Y direction is referred to as a first position. Further, the position of the gripping unit 50 at a position downstream of the first position in the +Y direction in the release state of the gripping unit 50 is referred to as a second position. That is, the gripping unit 50 is in the gripping state in the first position in the +Y direction and in the release state in the second position in the +Y direction.

As illustrated in FIG. 9, the shock absorber 98 is an example of another buffer member, and is attached to the end portion of the bottom wall 53 on the −Y direction side via a bracket (not illustrated). In other words, the shock absorber 98 is indirectly provided to the gripping unit 50.

The shock absorber 98 includes a main body portion 98A and a movable unit 98B protruding in the −Y direction from the main body portion 98A. The movable unit 98B faces the vertical portion 19B (FIG. 4) in the Y direction. In the shock absorber 98, an impact force acting on the movable unit 98B due to contact with the vertical portion 19B is attenuated in the main body portion 98A. In this way, the shock absorber 98 buffers the impact force caused by contact between the gripping unit 50 and the stopper 19 (FIG. 4).

As illustrated in FIG. 4, the return carriage 100 is an example of a return unit, and has a function of moving the gripping unit 50 in the −Y direction. Further, the return carriage 100 is capable of being driven in both the +Y direction and the −Y direction by a driving unit 105.

Specifically, the return carriage 100 includes a bottom wall portion 101, a vertical wall portion 102, and sidewall portions 103. Further, the return carriage 100 is provided with a sponge 104.

The bottom wall portion 101 is formed in a plate shape having a predetermined thickness in the Z direction. The vertical wall portion 102 stands upright in the +Z direction from an end portion of the bottom wall portion 101 on the +X direction side. The two side wall portions 103 extend in the −X direction from both end portions of the vertical wall portion 102 in the Y direction.

The vertical wall portion 102 is attached to the slide block 44 (FIG. 3). In other words, the return carriage 100 is supported by the slide block 44. Thus, the return carriage 100 is movable in the Y direction along the guide rail 42.

Note that, when the gripping unit 50 is positioned in the second position, the return carriage 100 is positioned separated from and downstream of the gripping unit 50 in the +Y direction. In other words, when the gripping unit 50 is in the second position, in a state in which the sponge 104 is not present, a gap is formed between the gripping unit 50 and the return carriage 100.

The driving unit 105 is an example of a driving portion and includes a driven pulley 109, a driving pulley (not illustrated), a driving belt 107, and a motor 108.

The driven pulley 109 is disposed at a position on the −Y direction side of the driving pulley and rotatably supported by the supporting frame 14. The driven pulley 109 and the driving pulley are rotatable about an axis in the X direction.

The driving belt 107 is stretched around the driven pulley 109 and the driving pulley and revolvable. Further, the bottom wall portion 101 is fixed to a portion of the driving belt 107.

The motor 108, by being energized by a power source (not illustrated), is driven and rotates the driving pulley.

In this way, the driving unit 105 is configured to be capable of driving the return carriage 100 in the Y direction.

When the gripping unit 50 is in the second position, the driving unit 105 drives the return carriage 100 in the −Y direction on the basis of an instruction from the control unit 18 (FIG. 1). In other words, the return carriage 100 is driven by the driving unit 105 in the second position, applying a pressing force in the −Y direction against the gripping unit 50 with the sponge 104 interposed therebetween, causing the gripping unit 50 to move in the −Y direction.

Further, when the gripping unit 50 is in the first position, the driving unit 105 drives the return carriage 100 in the +Y direction on the basis of an instruction from the control unit 18. This causes the return carriage 100 to return to its origin position.

The sponge 104 is an example of an buffer member, and is formed in a rectangular parallelepiped shape. Further, the sponge 104 is adhered to a side surface on the −Y direction side of the side wall 103 on the −Y direction side, and faces the gripping unit 50 in the Y direction.

A length corresponding to a thickness of the sponge 104 in the Y direction is set so that, when the gripping unit 50 is in the second position, the gripping unit 50 and the sponge 104 come into contact with each other and the sponge 104 is compressed. That is, when the gripping unit 50 is moved in the +Y direction and reaches the second position, the sponge 104 buffers the impact force generated by the contact between the return carriage 100 and the gripping unit 50, and elastically deforms in the Y direction.

Next, the action of the printer 10 will be described. Note that, when description is made using FIG. 1 to FIG. 9, individual drawing numbers will not be described.

The states of the gripping unit 50 and the return carriage 100 are schematically illustrated in FIGS. 10A, 10B, 10C, 10D, and 10E. Illustrations of the fiber M (FIG. 1), the sponge 104 (FIG. 4), the driving unit 105 (FIG. 4), and the like are omitted.

Figure 10A:
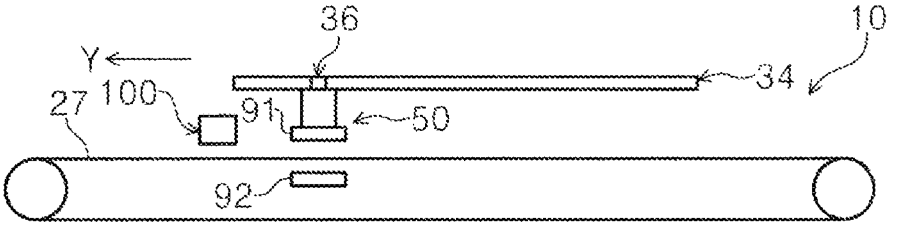
FIG. 10A is a schematic view illustrating a first step of using the gripping unit of the first exemplary embodiment to detect a movement distance of the glue belt.

As illustrated in FIG. 10A, in the second position, the gripping unit 50 is in a release state. The return carriage 100 is positioned in the +Y direction relative to the gripping unit 50.

Figure 10B:
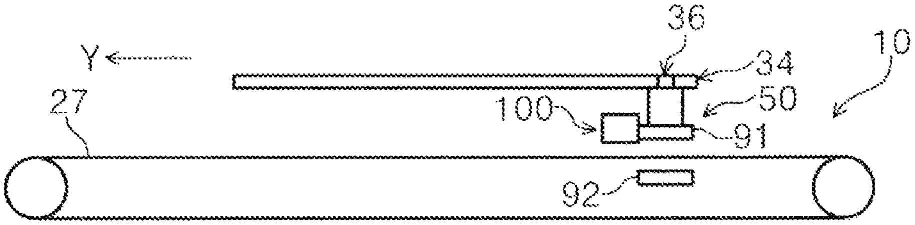
FIG. 10B is a schematic diagram illustrating a second step of detecting the movement distance.

As illustrated in FIG. 10B, the return carriage 100 is driven in the −Y direction by the driving unit 105, causing the gripping unit 50 to return to the first position.

Figure 10C:
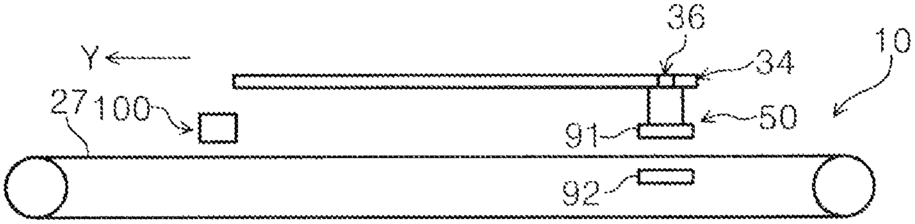
FIG. 10C is a schematic diagram illustrating a third step of detecting the movement distance.

As illustrated in FIG. 10C, after the gripping unit 50 has been returned to the first position, the return carriage 100 is returned to its original position in the +Y direction by the driving unit 105.

Figure 10D:
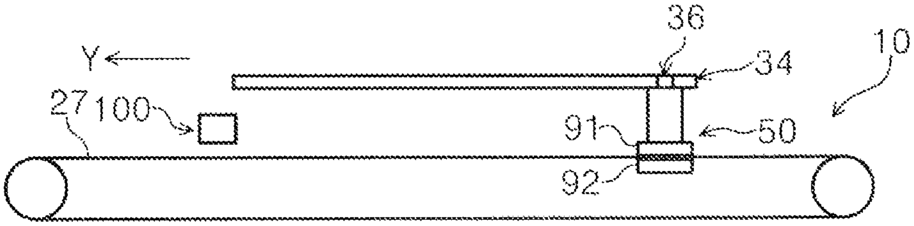
FIG. 10D is a schematic diagram illustrating a fourth step of detecting the movement distance.

As illustrated in FIG. 10D, in the first position, the gripping unit 50 grips the glue belt 27.

Figure 10E:
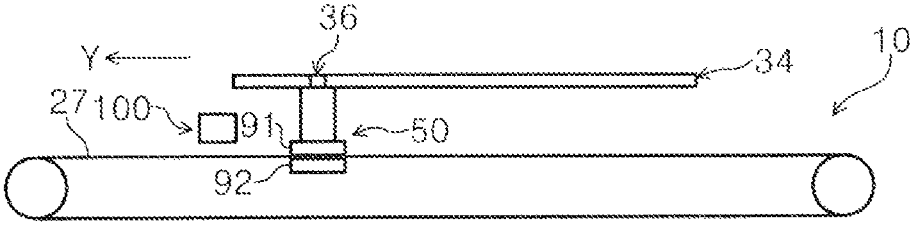
FIG. 10E is a schematic diagram illustrating a fifth step of detecting the movement distance.

As illustrated in FIG. 10E, when the glue belt 27 is moved in the +Y direction to transport the fiber M, the gripping unit 50gripping the glue belt 27 moves in the +Y direction along with the glue belt 27. At this time, the reading head 36 reads the magnetic scale of the scale unit 34, and thus the movement distance of the gripping unit 50 from the first position in the +Y direction is detected as the movement distance of the glue belt 27 in the +Y direction.

Figure 11:
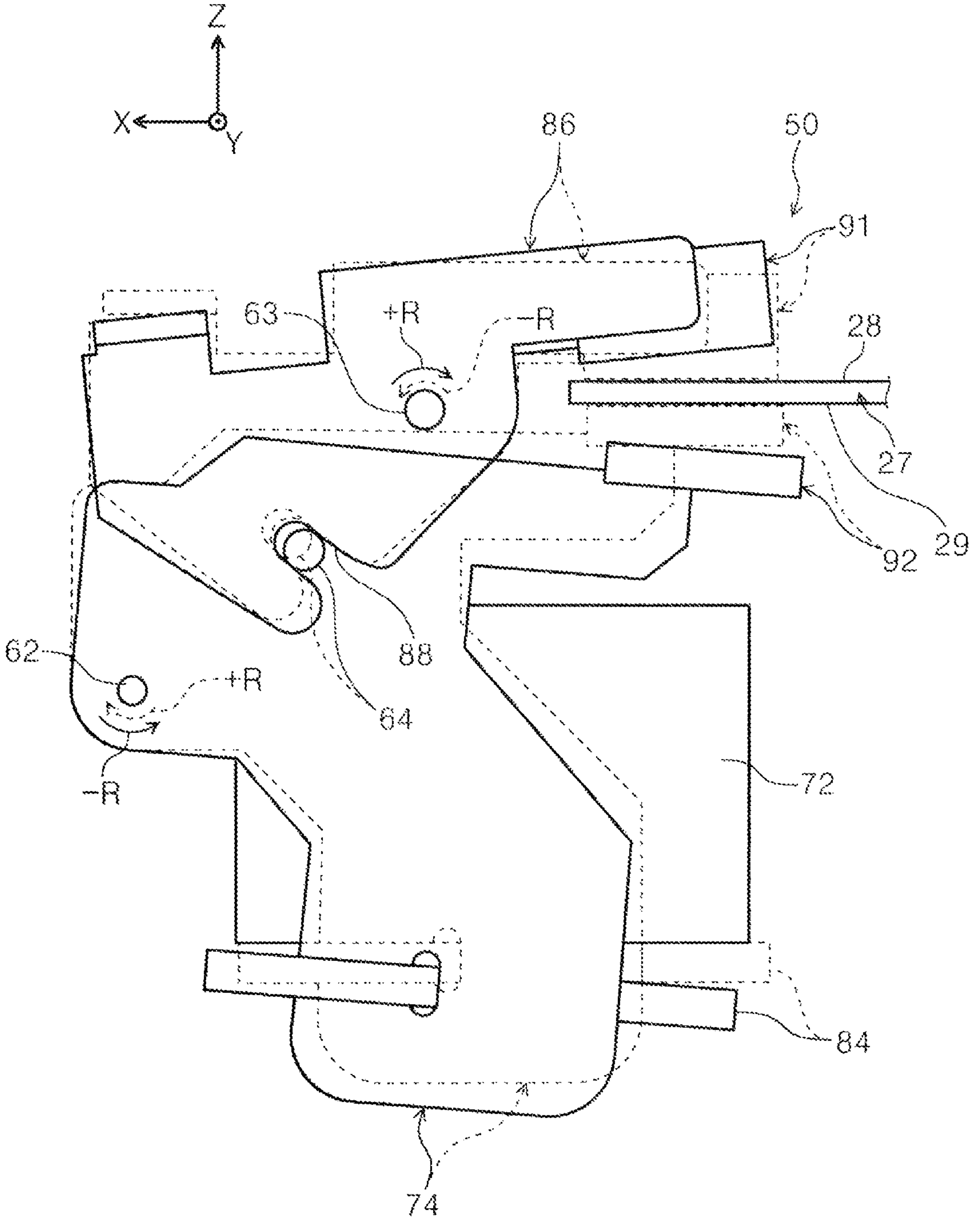
FIG. 11 is a schematic view illustrating a gripping state and a release state of the gripping unit of the first exemplary embodiment.

The release state and the gripping state of the gripping unit 50 are illustrated in FIG. 11. The solid lines represent the outer shape of each member in the release state, and the dashed lines and the dash-dot lines represent the outer shape of each member in the gripping state.

In the release state of the gripping unit 50, a magnetic field is generated in the electromagnet 72, and the armature 84 is attracted by the electromagnet 72. This causes the lower levers 74 to rotate in the −R direction.

As the lower levers 74 rotates in the −R direction, the link shaft 64 moves obliquely upward. At this time, the moving link shaft 64 is brought into contact with the recessed portions 88, thereby applying rotary power to the upper levers 86. The upper levers 86 receive this rotary power and are thus rotated in the +R direction. In this manner, the rotation of the lower levers 74 in the −R direction and the rotation of the upper levers 86 in the +R direction are linked, thereby causing the first abutting portion 91 to come into contact with the first surface 28, and the second abutting portion 92 to come into contact with the second surface 29. That is, both end portions of the glue belt 27 in the X direction are gripped by the gripping unit 50.

On the other hand, when the magnetic field disappears by the electromagnet 72 being de-energized, the armature 84 separates from the electromagnet 72 under its own weight. This causes the lower levers 74 to rotate in the +R direction.

As the lower levers 74 rotate in the +R direction, the link shaft 64 moves obliquely downward. At this time, the rotary power applied by the link shaft 64 decreases, causing the upper levers 86 to rotate in the −R direction. In this manner, the rotation of the lower levers 74 in the +R direction and the rotation of the upper levers 86 in the −R direction are linked, thereby causing the first abutting portion 91 to separate from the first surface 28, and the second abutting portion 92 to separate from the second surface 29. That is, the gripping unit 50 is in the release state.

As described above, according to the printer 10, the first abutting portion 91 and the second abutting portion 92 are separated from the glue belt 27 in the release state. Thus, when the gripping unit 50 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Further, in comparison to a configuration in which at least one of the upper lever 86 and the lower lever 74 is attracted via a motor and a link mechanism, space required for movement of the link mechanism is unnecessary, making it possible to miniaturize the switching unit 71 and the gripping unit 50.

According to the printer 10, in comparison to a configuration in which the upper lever 86 and the lower lever 74 are coupled to different members, the upper lever 86 and the lower lever 74 are coupled to the same mounting frame 57, thereby reducing a relative assembly error of the upper lever 86 and the lower lever 74 and thus making it possible to suppress a relative position shift between the upper lever 86 and the lower lever 74 in the link shaft 64.

Further, the armature 84, which is a portion suctioned by the electromagnet 72, is separated from the electromagnet 72 in the gripping state, making it possible to reduce the magnetization of the lower lever 74 in comparison to a case in which there is no separation. Thus, residual magnetization of the lower lever 74 after the current flowing through the electromagnet 72 is cut off is reduced, and the lower lever 74 is separated from the electromagnet 72 by the action of gravity, making it possible to switch to the release state using a simple configuration.

According to the printer 10, a strength of a magnetic line of force used in the scale unit 34 is less likely to be reduced by foreign material such as dust in comparison to a strength of a light beam, making it possible to suppress a reduction in a reading accuracy of the plurality of magnets 35 by the reading head 36 when foreign material adheres to the scale unit 34.

Further, the gripping unit 50 is supported by the supporting frame 14 including the supporting plate 17, making it possible to adjust the position of the gripping unit 50 in the device height direction in the gripping state. By this action, even if the glue belt 27 is bent and the position of the glue belt 27 is shifted in the thickness direction, the gripping unit 50 can grip the glue belt 27. Furthermore, in comparison to a case in which the gripping unit 50 includes the driving unit 105, it is possible to suppress the action of a mechanical load on the gripping unit 50. Thus, mechanical loads other than a mechanical load of the guide rail 42 and the slide block 44 on the gripping unit 50 do not act on the gripping unit 50 and thus, when the gripping unit 50 in the gripping state moves from the second position to the first position in the −Y direction, the movement of the gripping unit 50 is not inhibited by the mechanical load.

Accordingly, a shift in the position at which the gripping unit 50 grips the glue belt 27 in the +Y direction is suppressed, making it possible to suppress a reduction in the detection accuracy of the displacement of the glue belt 27 caused by the gripping unit 50.

According to the printer 10, when the return carriage 100 moves the gripping unit 50 in the −Y direction, the impact force acting on the gripping unit 50 can be bufferd by the sponge 104 in comparison to a case in which the return carriage 100 comes into direct contact with the gripping unit 50. Thus, failures in operation of the gripping unit 50 can be suppressed.

Further, in comparison to a case in which the gripping unit 50 comes into direct contact with the stopper 19, the impact force applied to the gripping unit 50 can be bufferd by the shock absorber 98. Thus, failures in operation of the gripping unit 50 can be suppressed.

Second Exemplary Embodiment

Next, as an example of the recording device according to the present disclosure, a printer 110 of a second exemplary embodiment will be described in detail with reference to the appended drawings. Note that portions common to those of the first exemplary embodiment are denoted by the same reference signs, and descriptions thereof and descriptions of individual drawing numbers will be omitted.

Figure 12:
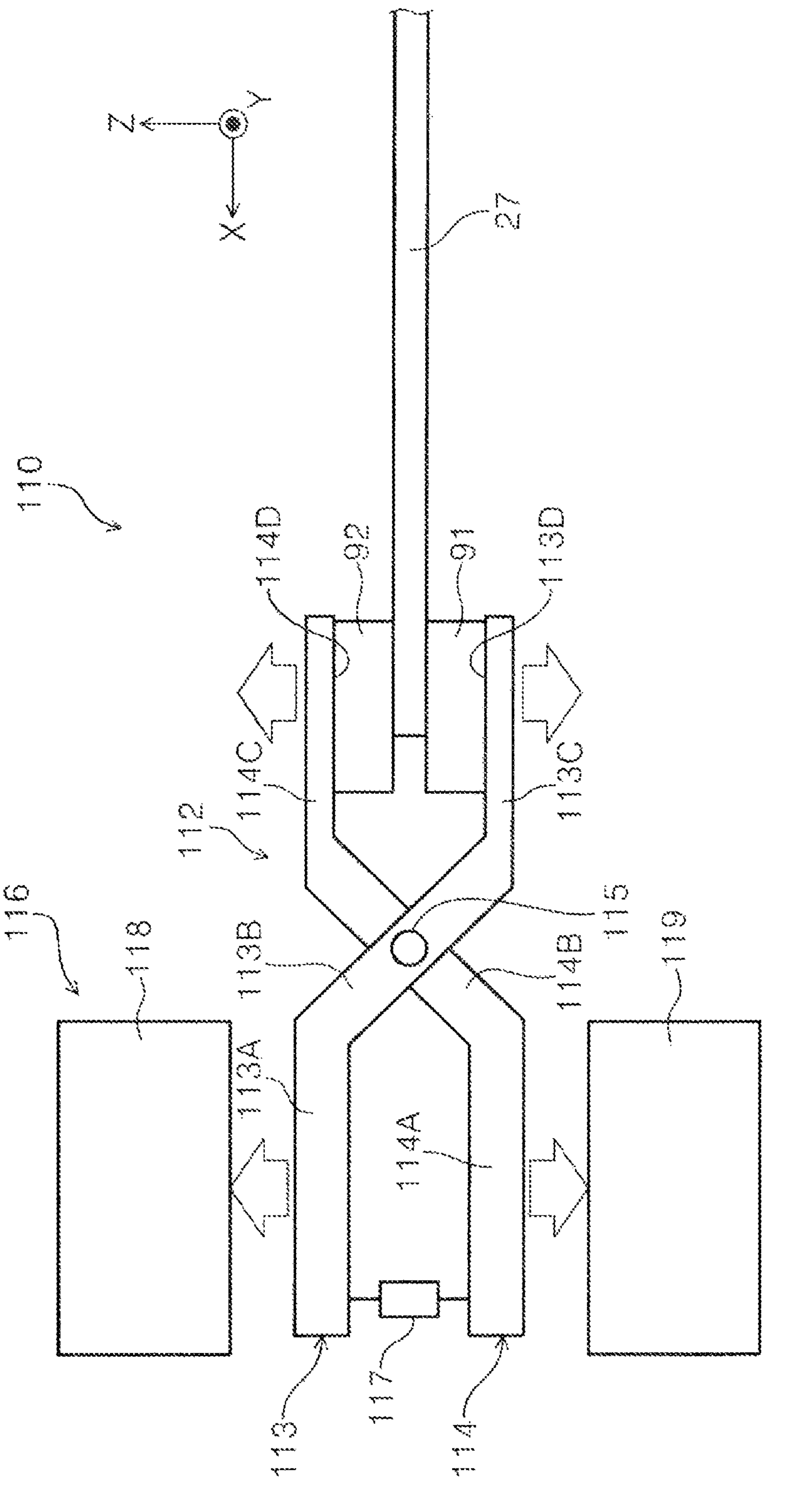
FIG. 12 is a schematic view illustrating a gripping unit of a printer according to a second exemplary embodiment.

FIG. 12 illustrates a portion of the printer 110 of the second exemplary embodiment.

The printer 110 includes a gripping unit 112 in place of the gripping unit 50 in the printer 10. Other configurations are basically the same as those of the printer 10. An end portion on the +X direction side and an end portion on the −X direction side of the gripping unit 112 are disposed symmetrically with respect to a center of the glue belt 27 in the X direction. Therefore, one configuration will be described and description of the other will be omitted.

The gripping unit 112 includes a first supporting member 113 that supports the first abutting portion 91, a second supporting member 114 that supports the second abutting portion 92, and a switching unit 116. Note that the gripping unit 112 also includes the supporting bracket 52 and the mounting frame 57, but the drawings and descriptions thereof are omitted. The reading head 36 is attached to the supporting bracket 52.

The first supporting member 113 includes an arm portion 113A extending in the X direction, an inclined portion 113B extending obliquely downward from an end portion of the arm portion 113A on the −X direction side, and an attachment portion 113C extending in the −X direction from a lower end of the inclined portion 113B. The first abutting portion 91 is attached to an upper surface 113D of the attachment portion 113C on the +Z direction side.

The second supporting member 114 includes an arm portion 114A extending in the X direction, an inclined portion 114B extending obliquely upward from an end portion of the arm portion 114A on the −X direction side, and an attachment portion 114C extending in the −X direction from a lower end of the inclined portion 114B. The second abutting portion 92 is attached to a lower surface 114D of the attachment portion 114C on the −Z direction side.

The inclined portion 113B and the inclined portion 114B are coupled by a coupling pin 115 having a central axis in the Y direction, and thus can relatively rotate.

The switching unit 116 includes a tension spring 117, an electromagnet 118, and an electromagnet 119.

The tension spring 117 is disposed between the arm portion 113A and the arm portion 114A in the Z direction, and couples the arm portion 113A and the arm portion 114A. Thus, the tension spring 117 exerts tensile forces on the arm portion 113A and the arm portion 114A in directions that bring the arm portion 113A and the arm portion 114A closer to each other.

The electromagnet 118 is positioned in the +Z direction with respect to the arm portion 113A and, by being energized, attracts the arm portion 113A in the +Z direction.

The electromagnet 119 is positioned in the −Z direction with respect to the arm portion 114A and, by being energized, attracts the arm portion 114A in the −Z direction.

In the gripping unit 112, when the electromagnets 118, 119 are energized, the arm portion 113A is attracted in the +Z direction while resisting the tensile force of the tension spring 117, and the arm portion 114A is attracted in the −Z direction while resisting the tensile force of the tension spring 117. Thus, the first supporting member 113 and the second supporting member 114 are rotated about the coupling pin 115, and the first abutting portion 91 and the second abutting portion 92 are separated, thereby bringing the gripping unit 112 into the release state. Further, in the gripping unit 112, when the electromagnets 118, 119 are not energized, the tensile force of the tension spring 117 acts, causing the arm portion 113A and the arm portion 114A to be attracted in directions that bring the arm portion 113A and the arm portion 114A closer to each other. Thus, the first supporting member 113 and the second supporting member 114 are rotated about the coupling pin 115, and the first abutting portion 91 and the second abutting portion 92 grip the glue belt 27, thereby bringing the gripping unit 112 into the gripping state.

According to the printer 110, the first abutting portion 91 and the second abutting portion 92 are separated from the glue belt 27 in the release state. Thus, when the gripping unit 112 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Third Exemplary Embodiment

Next, as an example of the recording device according to the present disclosure, a printer 120 of a third exemplary embodiment will be described in detail with reference to the appended drawings. Note that portions common to the first and second exemplary embodiments are denoted by the same reference signs, and descriptions thereof and descriptions of individual drawing numbers will be omitted. Common portions also include configurations that differ in length.

Figure 13:
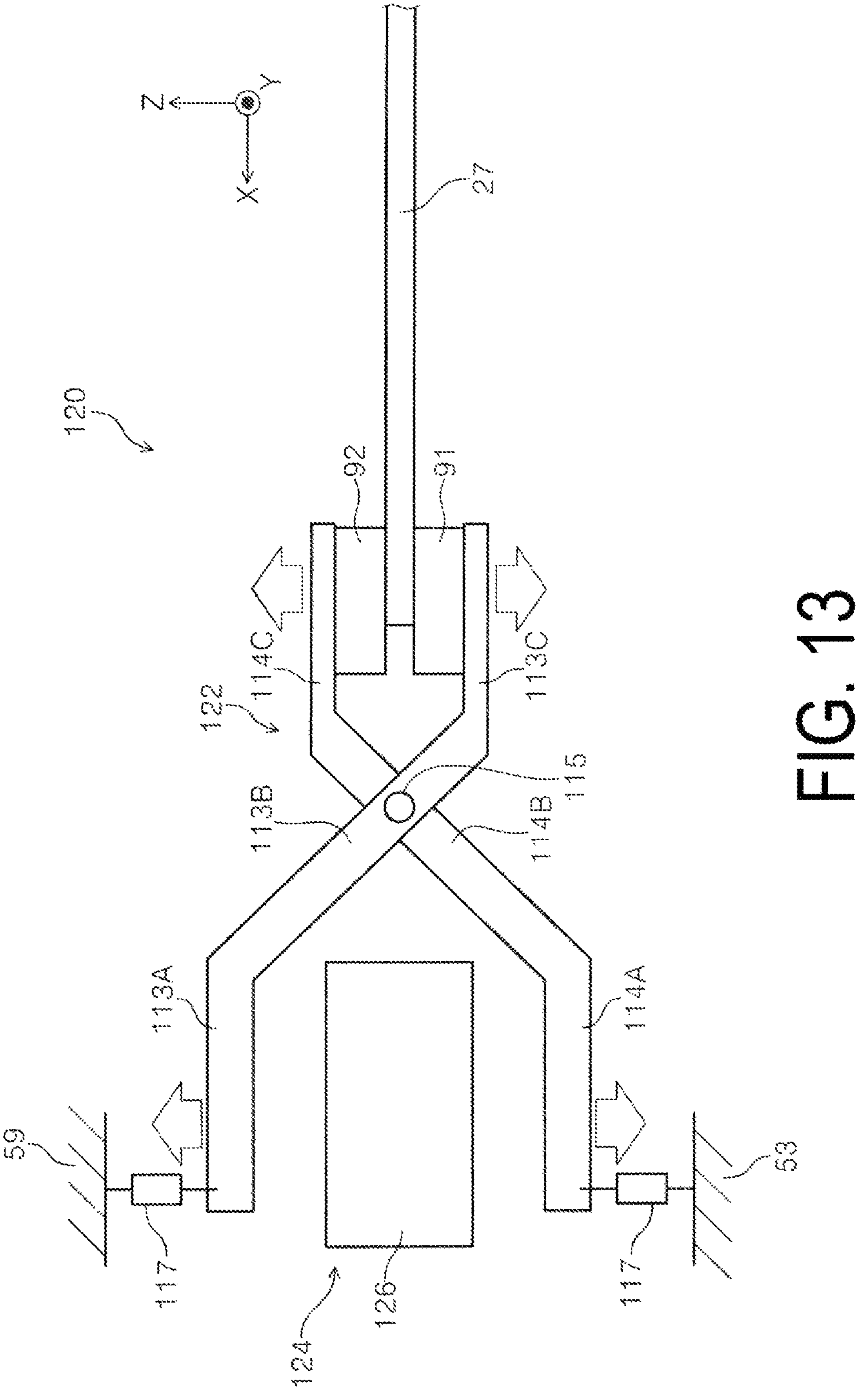
FIG. 13 is a schematic view illustrating a gripping unit of a printer according to a third exemplary embodiment.

FIG. 13 illustrates a portion of the printer 120 of the third exemplary embodiment.

The printer 120 includes a gripping unit 122 in place of the gripping unit 112 in the printer 110. Other configurations are basically the same as those of the printer 110. In the gripping unit 122, an end portion on the +X direction side and an end portion on the −X direction side of the glue belt 27 are disposed symmetrically with respect to a center in the X direction. Therefore, one configuration will be described and description of the other will be omitted.

The gripping unit 122 includes the first supporting member 113 that supports the first abutting portion 91, the second supporting member 114 that supports the second abutting portion 92, and a switching unit 124. Note that the gripping unit 122 also includes the reading head 36, the supporting bracket 52, and the mounting frame 57, but the drawings and descriptions thereof are omitted.

Lengths of the inclined portion 113B and the inclined portion 114B in the inclination directions are long in comparison to those of the inclined portion 113B and the inclined portion 114B of the second exemplary embodiment.

The switching unit 124 includes two tension springs 117 and one electromagnet 126.

One of the tension springs 117 couples the arm portion 113A and the upper plate portion 59, and exerts a tensile force in the +Z direction on the arm portion 113A. The other tension spring 117 couples the arm portion 114A and the bottom wall 53, and exerts a tensile force in the −Z direction on the arm portion 114A.

The electromagnet 126 is positioned between the arm portion 113A and the arm portion 114A in the Z direction and, by being energized, attracts the arm portion 113A in the −Z direction and attracts the arm portion 114A in the +Z direction.

In the gripping unit 122, when the electromagnet 126 is not energized, the tensile force of the tension springs 117 act to attract the arm portion 113A in the +Z direction and attract the arm portion 114A in the −Z direction. Thus, the first supporting member 113 and the second supporting member 114 are rotated about the coupling pin 115, and the first abutting portion 91 and the second abutting portion 92 are separated, thereby bringing the gripping unit 122 into the release state.

Further, in the gripping unit 122, when the electromagnet 126 is energized, the arm portion 113A is attracted in the −Z direction while resisting the tensile force of the tension spring 117, and the arm portion 114A is attracted in the +Z direction while resisting the tensile force of the tension spring 117. Thus, the first supporting member 113 and the second supporting member 114 are rotated about the coupling pin 115, and the first abutting portion 91 and the second abutting portion 92grip the glue belt 27, thereby bringing the gripping unit 122 into the gripping state.

According to the printer 120, the first abutting portion 91 and the second abutting portion 92 are separated from the glue belt 27 in the release state. Thus, when the gripping unit 122 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Fourth Exemplary Embodiment

Next, as an example of the recording device according to the present disclosure, a printer 130 of a fourth exemplary embodiment will be described in detail with reference to the appended drawings. Note that portions common to the first exemplary embodiment to the third exemplary embodiment are denoted by the same reference signs, and descriptions thereof and descriptions of individual drawing numbers will be omitted. Common portions also include configurations that differ in length.

Figure 14:
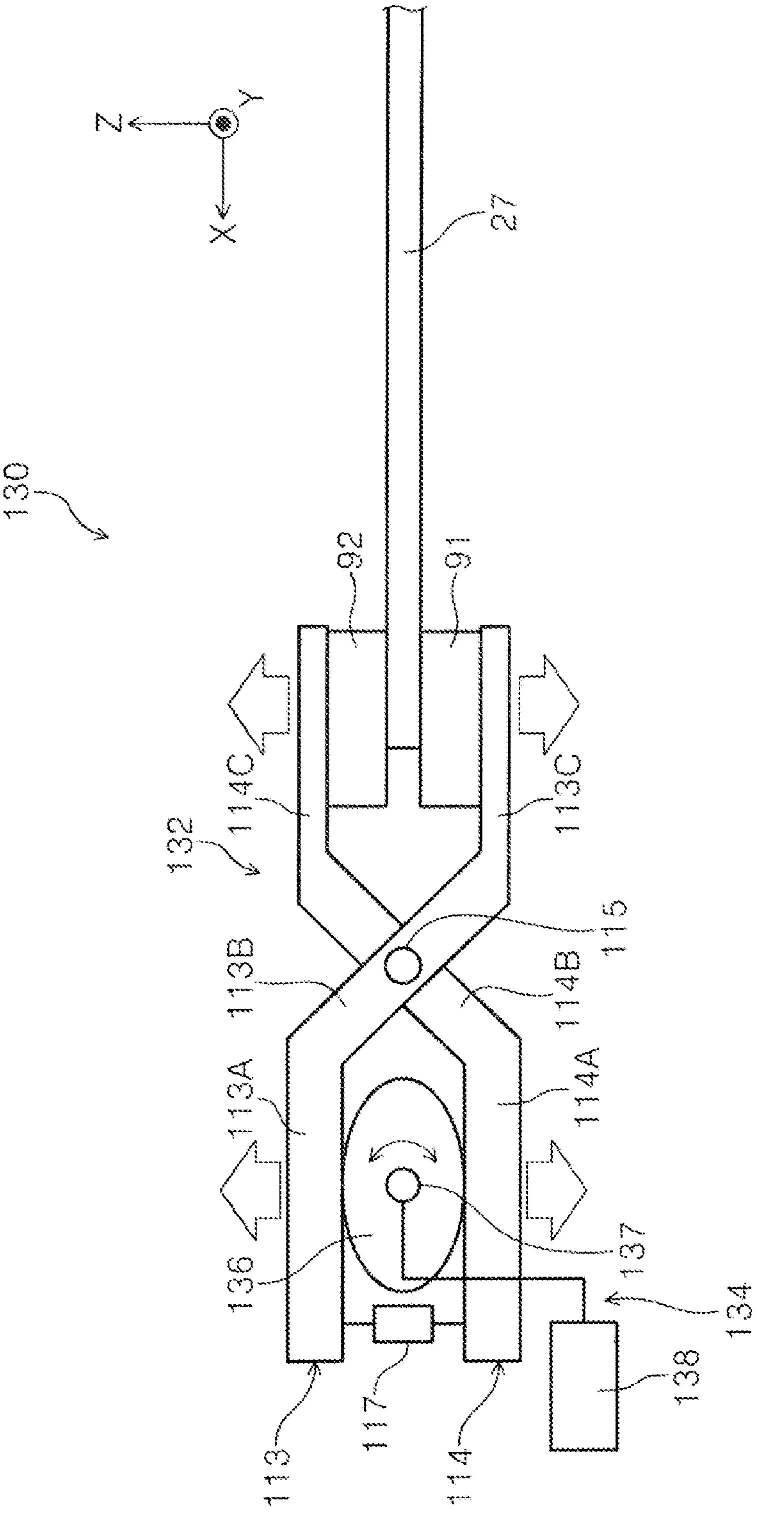
FIG. 14 is a schematic view illustrating a gripping unit of a printer according to a fourth exemplary embodiment.

FIG. 14 illustrates a portion of the printer 130 of the fourth exemplary embodiment.

The printer 130 includes a gripping unit 132 in place of the gripping unit 112 in the printer 110. Other configurations are basically the same as those of the printer 110. In the gripping unit 132, an end portion on the +X direction side and an end portion on the −X direction side of the glue belt 27 are disposed symmetrically with respect to a center in the X direction. Therefore, one configuration will be described and description of the other will be omitted.

The gripping unit 132 includes the first supporting member 113 that supports the first abutting portion 91, the second supporting member 114 that supports the second abutting portion 92, and a switching unit 134. Note that the gripping unit 132 also includes the reading head 36, the supporting bracket 52, and the mounting frame 57, but the drawings and descriptions thereof are omitted.

The switching unit 134 includes the tension spring 117, a cam member 136, and a motor 138.

The tension spring 117 couples the arm portion 113A and the arm portion 114A, and exerts tensile forces on the arm portion 113A and the arm portion 114A in directions that bring the arm portion 113A and the arm portion 114A closer to each other.

The cam member 136 is formed in an oval shape when viewed from the Y direction. Further, the cam member 136 is provided with a support shaft 137 that has a central axis in the Y direction and passes through a center of the cam member 136. The support shaft 137 is rotatably supported by the side plate portion 58.

The motor 138 rotates the support shaft 137, thereby rotating the cam member 136.

In the gripping unit 132, when a long axis of the cam member 136 is disposed in the X direction, the tensile force of the tension spring 117 acts, causing the arm portion 113A and the arm portion 114A to be attracted in directions that bring the arm portion 113A and the arm portion 114A closer to each other. Thus, the first supporting member 113 and the second supporting member 114 are rotated about the coupling pin 115, and the first abutting portion 91 and the second abutting portion 92 grip the glue belt 27, thereby bringing the gripping unit 122 into the gripping state.

Further, in the gripping unit 132, when the cam member 136 is rotated by the motor 138 and the long axis of the cam member is disposed in a direction intersecting the X direction, the arm portion 113A is pressed in the +Z direction while resisting the tensile force of the tension spring 117, and the arm portion 114A is pressed in the −Z direction while resisting the tensile force of the tension spring 117. Thus, the first supporting member 113 and the second supporting member 114 are rotated about the coupling pin 115, and the first abutting portion 91 and the second abutting portion 92 grip the glue belt 27, thereby bringing the gripping unit 132 into the gripping state.

According to the printer 130, the first abutting portion 91 and the second abutting portion 92 are separated from the glue belt 27 in the release state. Thus, when the gripping unit 132 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Exemplary Embodiment 5

Next, as an example of the recording device according to the present disclosure, a printer 140 of a fifth exemplary embodiment will be described in detail with reference to the appended drawings. Note that portions common to the first exemplary embodiment to the fourth exemplary embodiment are denoted by the same reference signs, and descriptions thereof and descriptions of individual drawing numbers will be omitted. Common portions also include configurations that differ in length.

Figure 15:
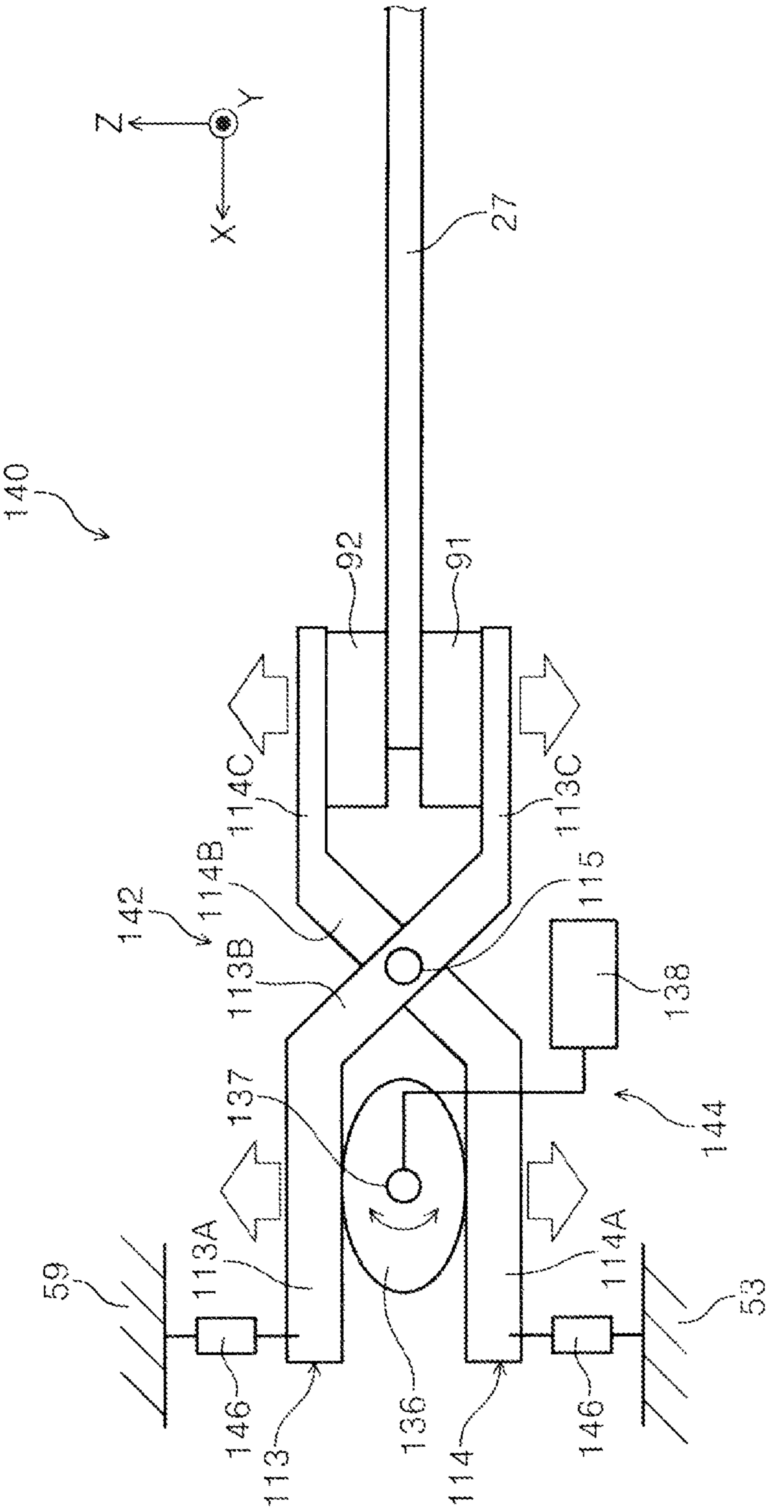
FIG. 15 is a schematic view illustrating a gripping unit of a printer according to a fifth exemplary embodiment.

FIG. 15 illustrates a portion of the printer 140 of the fifth exemplary embodiment.

The printer 140 includes a gripping unit 142 in place of the gripping unit 132 in the printer 130. Other configurations are basically the same as those of the printer 130. In the gripping unit 142, an end portion on the +X direction side and an end portion on the −X direction side of the glue belt 27 are disposed symmetrically with respect to a center in the X direction. Therefore, one configuration will be described and description of the other will be omitted.

The gripping unit 142 includes the first supporting member 113 that supports the first abutting portion 91, the second supporting member 114 that supports the second abutting portion 92, and a switching unit 144. Note that the gripping unit 132 also includes the reading head 36, the supporting bracket 52, and the mounting frame 57, but the drawings and descriptions thereof are omitted.

The switching unit 144 includes two pressing springs 146, the cam member 136, and the motor 138.

One of the pressing springs 146 couples the arm portion 113A and the upper plate portion 59, and exerts a tensile force in the −Z direction on the arm portion 113A. The other pressing spring 146 couples the arm portion 114A and the bottom wall 53, and exerts a tensile force in the +Z direction on the arm portion 114A.

In the gripping unit 142, when the long axis of the cam member 136 is disposed in the X direction, the arm portion 113A is pressed in the −Z direction, and the arm portion 114A is pressed in the +Z direction. Thus, the first supporting member 113 and the second supporting member 114 are rotated about the coupling pin 115, and the first abutting portion 91 and the second abutting portion 92grip the glue belt 27, thereby bringing the gripping unit 122 into the gripping state.

Further, in the gripping unit 142, when the cam member 136 is rotated by the motor 138 and the long axis of the cam member is disposed in a direction intersecting the X direction, the arm portion 113A is pressed in the +Z direction while resisting the pressing force of the pressing spring 146, and the arm portion 114A is pressed in the −Z direction while resisting the pressing force of the pressing spring 146. Thus, the first supporting member 113 and the second supporting member 114 are rotated about the coupling pin 115, and the first abutting portion 91 and the second abutting portion 92 are separated, thereby bringing the gripping unit 142 into the release state.

According to the printer 140, the first abutting portion 91 and the second abutting portion 92 are separated from the glue belt 27 in the release state. Thus, when the gripping unit 142 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Sixth Exemplary Embodiment

Next, as an example of the recording device according to the present disclosure, a printer 150 of a sixth exemplary embodiment will be described in detail with reference to the appended drawings. Note that portions common to the first exemplary embodiment to the fifth exemplary embodiment are denoted by the same reference signs, and descriptions thereof and descriptions of individual drawing numbers will be omitted. Common portions also include configurations that differ in length.

Figure 16:
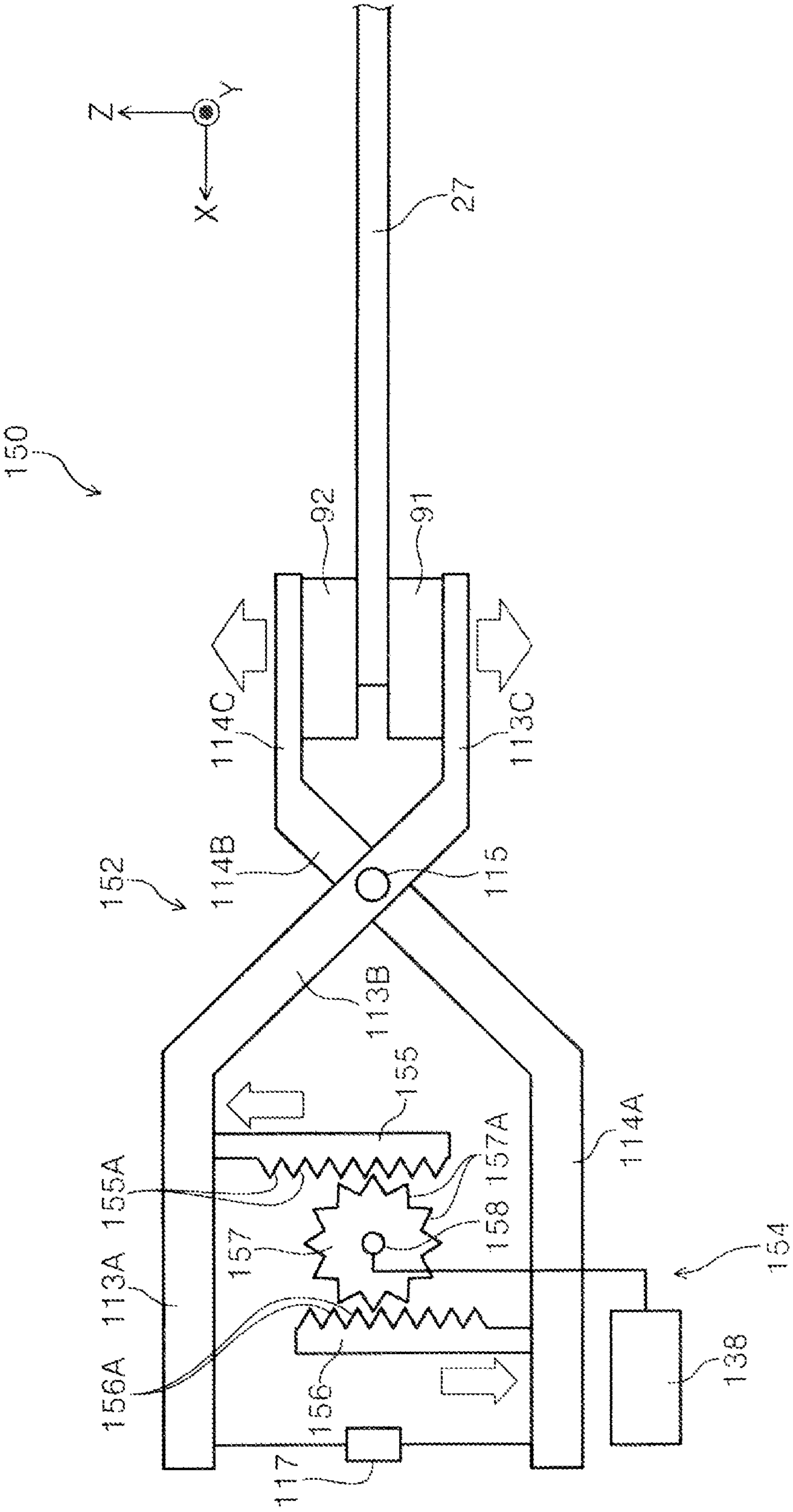
FIG. 16 is a schematic view illustrating a gripping unit of a printer according to a sixth exemplary embodiment.

FIG. 16 illustrates a portion of the printer 150 of the sixth exemplary embodiment.

The printer 150 includes a gripping unit 152 in place of the gripping unit 112 in the printer 110. Other configurations are basically the same as those of the printer 110. In the gripping unit 152, an end portion on the +X direction side and an end portion on the −X direction side of the glue belt 27 are disposed symmetrically with respect to a center in the X direction. Therefore, one configuration will be described and description of the other will be omitted.

The gripping unit 152 includes the first supporting member 113 that supports the first abutting portion 91, the second supporting member 114 that supports the second abutting portion 92, and a switching unit 154. Note that the gripping unit 152 also includes the reading head 36, the supporting bracket 52, and the mounting frame 57, but the drawings and descriptions thereof are omitted. The lengths of the arm portions 113A, 114A and the inclined portions 113B, 114B are long in comparison to those in the configuration of the second exemplary embodiment.

The switching unit 154 includes the tension spring 117, a rack 155, a rack 156, a pinion 157, and the motor 138.

The tension spring 117 couples the arm portion 113A and the arm portion 114A, and exerts tensile forces on the arm portion 113A and the arm portion 114A in directions that bring the arm portion 113A and the arm portion 114A closer to each other.

The rack 155 is disposed in the −Z direction with respect to the arm portion 113A. An end portion of the rack 155 on the +Z direction side is in contact with the arm portion 113A. The rack 155 is movably supported in the Z direction by a guide member (not illustrated). A plurality of teeth 155A are formed on the rack 155.

The rack 156 is disposed in the +Z direction with respect to the arm portion 114A. An end portion of the rack 156 on the −Z direction side is in contact with the arm portion 114A. Further, the rack 156 is movably supported in the Z direction by a guide member (not illustrated). A plurality of teeth 156A are formed on the rack 156.

The pinion 157 is provided with a support shaft 158 that has a central axis in the Y direction and passes through a center of the pinion 157. The support shaft 158 is rotatably supported by the side plate portion 58. A plurality of teeth 157A are formed on an outer circumference portion of the pinion 157. A portion of the plurality of teeth 157A intermesh with a portion of the plurality of teeth 155A. The other portion of the plurality of teeth 157A intermesh with a portion of the plurality of teeth 156A.

The motor 138 rotates the rotating shaft 158, thereby rotating the pinion 157.

In the gripping unit 152, the pinion 157 is rotated by the motor 138 and the rack 156 moves in the −Z direction as the rack 155 moves in the +Z direction. Here, when the pressing forces acting on the arm portion 113A and the arm portion 114A from the rack 155 and rack 156 become greater than the tensile force of the tension spring 117, the arm portion 113A is pressed upward in the +Z direction and the arm portion 114A is pressed downward in the −Z direction. Thus, the first supporting member 113 and the second supporting member 114 are rotated about the coupling pin 115, and the first abutting portion 91 and the second abutting portion 92 are separated, thereby bringing the gripping unit 152 into the release state.

Further, in the gripping unit 152, when the pinion 157 is rotated in the reverse direction by the motor 138, the rack 156 moves in the +Z direction as the rack 155 moves in the −Z direction. Here, when the tensile force of the tension spring 117 becomes greater than the pressing forces acting on the arm portion 113A and the arm portion 114A from the rack 155 and the rack 156, the arm portion 113A and the arm portion 114A move closer to each other. Thus, the first supporting member 113 and the second supporting member 114 are rotated about the coupling pin 115, and the first abutting portion 91 and the second abutting portion 92 grip the glue belt 27, thereby bringing the gripping unit 152 into the gripping state.

According to the printer 150, the first abutting portion 91 and the second abutting portion 92 are separated from the glue belt 27 in the release state. Thus, when the gripping unit 152 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Seventh Exemplary Embodiment

Next, as an example of the recording device according to the present disclosure, a printer 160 of a seventh exemplary embodiment will be described in detail with reference to the appended drawings. Note that portions common to the first exemplary embodiment to the sixth exemplary embodiment are denoted by the same reference signs, and descriptions thereof and descriptions of individual drawing numbers will be omitted. Common portions also include configurations that differ in length.

Figure 17:
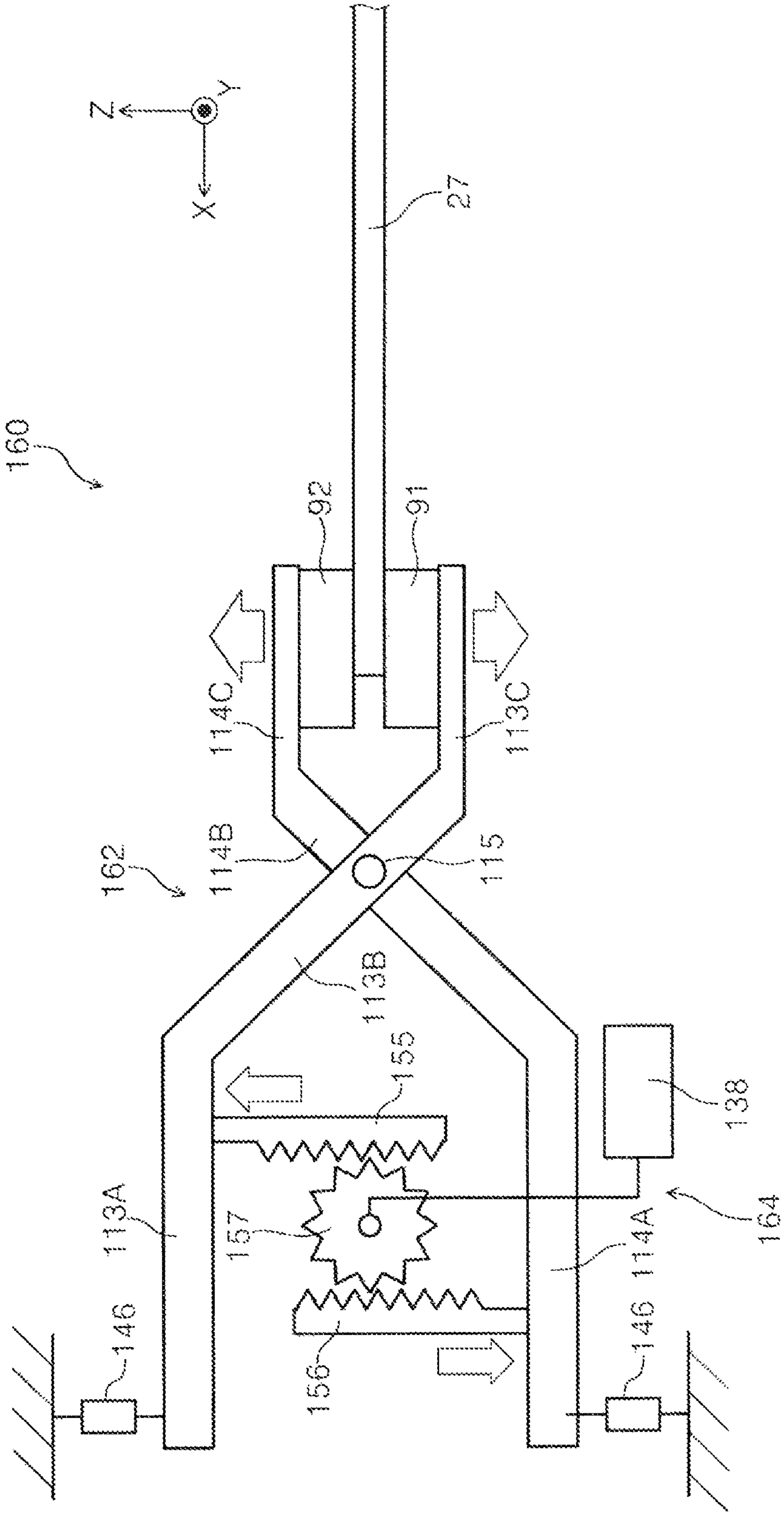
FIG. 17 is a schematic view illustrating a gripping unit of a printer according to a seventh exemplary embodiment.

FIG. 17 illustrates a portion of the printer 160 of the seventh exemplary embodiment.

The printer 160 includes a gripping unit 162 in place of the gripping unit 152 in the printer 150. Other configurations are basically the same as those of the printer 150. In the gripping unit 162, an end portion on the +X direction side and an end portion on the −X direction side of the glue belt 27 are disposed symmetrically with respect to a center in the X direction. Therefore, one configuration will be described and description of the other will be omitted.

The gripping unit 162 includes the first supporting member 113 that supports the first abutting portion 91, the second supporting member 114 that supports the second abutting portion 92, and a switching unit 164. Note that the gripping unit 162 also includes the reading head 36, the supporting bracket 52, and the mounting frame 57, but the drawings and descriptions thereof are omitted. The lengths of the arm portions 113A, 114A and the inclined portions 113B, 114B are the same as those in the configuration of the sixth exemplary embodiment.

The switching unit 164 includes two pressing springs 146, the rack 155, the rack 156, the pinion 157, and the motor 138.

One of the pressing springs 146 couples the arm portion 113A and the upper plate portion 59, and exerts a tensile force in the −Z direction on the arm portion 113A. The other pressing spring 146 couples the arm portion 114A and the bottom wall 53, and exerts a tensile force in the +Z direction on the arm portion 114A.

In the gripping unit 162, the pinion 157 is rotated by the motor 138 and the rack 156 moves in the −Z direction as the rack 155 moves in the +Z direction. Here, when the pressing forces acting on the arm portion 113A and the arm portion 114A from the rack 155 and rack 156 become greater than the pressing forces of the pressing springs 146, the arm portion 113A is pressed upward in the +Z direction and the arm portion 114A is pressed downward in the −Z direction. Thus, the first supporting member 113 and the second supporting member 114 are rotated about the coupling pin 115, and the first abutting portion 91 and the second abutting portion 92 are separated, thereby bringing the gripping unit 152 into the release state.

Further, in the gripping unit 162, when the pinion 157 is rotated in the reverse direction by the motor 138, the rack 156 moves in the +Z direction as the rack 155 moves in the −Z direction. Here, when the tensile forces of the two pressing springs 117 becomes greater than the pressing forces acting on the arm portion 113A and the arm portion 114A from the rack 155 and the rack 156, the arm portion 113A and the arm portion 114A move closer to each other. Thus, the first supporting member 113 and the second supporting member 114 are rotated about the coupling pin 115, and the first abutting portion 91 and the second abutting portion 92grip the glue belt 27, thereby bringing the gripping unit 162 into the gripping state.

According to the printer 160, the first abutting portion 91 and the second abutting portion 92 are separated from the glue belt 27 in the release state. Thus, when the gripping unit 162 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Eighth Exemplary Embodiment

Next, as an example of the recording device according to the present disclosure, a printer 170 of an eighth exemplary embodiment will be described in detail with reference to the appended drawings. Note that portions common to the first exemplary embodiment to the seventh exemplary embodiment are denoted by the same reference signs, and descriptions thereof and descriptions of individual drawing numbers will be omitted. Common portions also include configurations that differ in length.

Figure 18:
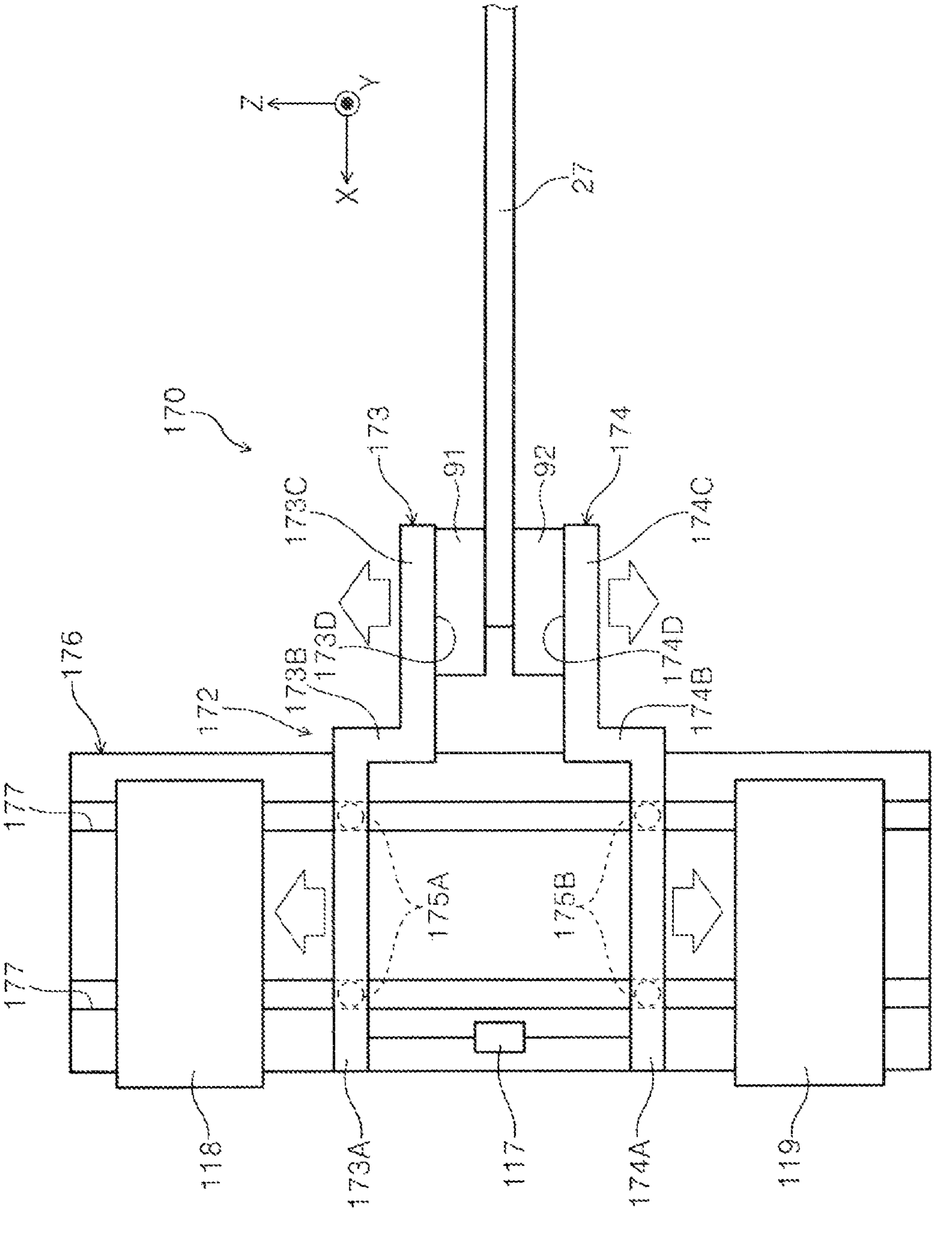
FIG. 18 is a schematic view illustrating a gripping unit of a printer according to an eighth exemplary embodiment.

FIG. 18 illustrates a portion of the printer 170 of the eighth exemplary embodiment.

The printer 170 includes a gripping unit 172 in place of the gripping unit 50 in the printer 10. Other configurations are basically the same as those of the printer 10. In the gripping unit 172, an end portion on the +X direction side and an end portion on the −X direction side of the glue belt 27 are disposed symmetrically with respect to a center in the X direction. Therefore, one configuration will be described and description of the other will be omitted.

The gripping unit 172 includes a first supporting member 173 that supports the first abutting portion 91, a second supporting member 174 that supports the second abutting portion 92, a guide member 176, and a switching unit 178. Note that the gripping unit 172 also includes the reading head 36 and the supporting bracket 52, but the drawings and descriptions thereof are omitted.

The first supporting member 173 includes an arm portion 173A extending in the X direction, a vertical portion 173B extending in the −Z direction from an end portion of the arm portion 173A on the −X direction side, and an attachment portion 173C extending in the −X direction from a lower end of the vertical portion 173B. The first abutting portion 91 is attached to a lower surface 173D of the attachment portion 173C on the −Z direction side. Two pins 175A, each having a central axis in the Y direction, are respectively provided on both end portions of the arm portion 173A in the Y direction.

The second supporting member 174 includes an arm portion 174A extending in the X direction, a vertical portion 174B extending in the −Z direction from an end portion of the arm portion 174A on the −X direction side, and an attachment portion 174C extending in the −X direction from an upper end of the vertical portion 177B. The second abutting portion 92 is attached to an upper surface 174D of the attachment portion 174C on the +Z direction side. Two pins 175B, each having a central axis in the Y direction, are respectively provided on both end portions of the arm portion 174A in the Y direction. The two pins 175B are guided along groove portions 177 described later in the +Z direction.

The guide member 176 is formed in a plate shape having a predetermined thickness in the Y direction. Further, two of the guide members 176 are provided to the supporting bracket 52 at an interval in the Y direction, with the groove portions 177 described later facing the Y direction. Note that the guide member 176 on the −Y direction side will be described, and description of the guide member 176 on the +Y direction side will be omitted.

Two groove portions 177 are formed in a side surface of the guide member 176 on the +Y direction side. The two groove portions 177 are disposed at an interval in the X direction and extend in the Z direction. Further, both of the two grooves 177 are open in the +Y direction. Note that the pins 175B may be provided on the guide member 176, and the groove portions 177 may be formed in the first supporting member 173 and the second supporting member 174.

The switching unit 178 includes one tension spring 117, the electromagnet 118, and the electromagnet 119.

The tension spring 178 couples the arm portion 173A and the arm portion 174A in the Z direction. Thus, the tension spring 117 exerts tensile forces on the arm portion 173A and the arm portion 174A in directions that bring the arm portion 173A and the arm portion 174A closer to each other.

The electromagnet 118 is positioned in the +Z direction with respect to the arm portion 173A and, by being energized, attracts the arm portion 173A in the +Z direction.

The electromagnet 119 is positioned in the −Z direction with respect to the arm portion 174A and, by being energized, attracts the arm portion 174A in the −Z direction.

In the gripping unit 172, when the electromagnets 118, 119 are energized, the arm portion 173A is attracted in the +Z direction while resisting the tensile force of the tension spring 117, and the arm portion 174A is attracted in the −Z direction while resisting the tensile force of the tension spring 117. Thus, the first abutting portion 91 and the second abutting portion 92 are separated, thereby bringing the gripping unit 172 into the release state.

Further, in the gripping unit 172, when the electromagnets 118, 119 are not energized, the tensile force of the tension spring 117 acts, causing the arm portion 173A and the arm portion 174A to be attracted in directions that bring the arm portion 173A and the arm portion 174A closer to each other. Thus, the first supporting member 173 and the second supporting member 174 move closer to each other in the Z direction, and the first abutting portion 91 and the second abutting portion 92 grip the glue belt 27, thereby bringing the gripping unit 172 into the gripping state.

According to the printer 170, the first abutting portion 91 and the second abutting portion 92 are separated from the glue belt 27 in the release state. Thus, when the gripping unit 172 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

Ninth Exemplary Embodiment

Next, as an example of the recording device according to the present disclosure, a printer 180 of a ninth exemplary embodiment will be described in detail with reference to the appended drawings. Note that portions common to the first exemplary embodiment to the eighth exemplary embodiment are denoted by the same reference signs, and descriptions thereof and descriptions of individual drawing numbers will be omitted. Common portions also include configurations that differ in length.

Figure 19:
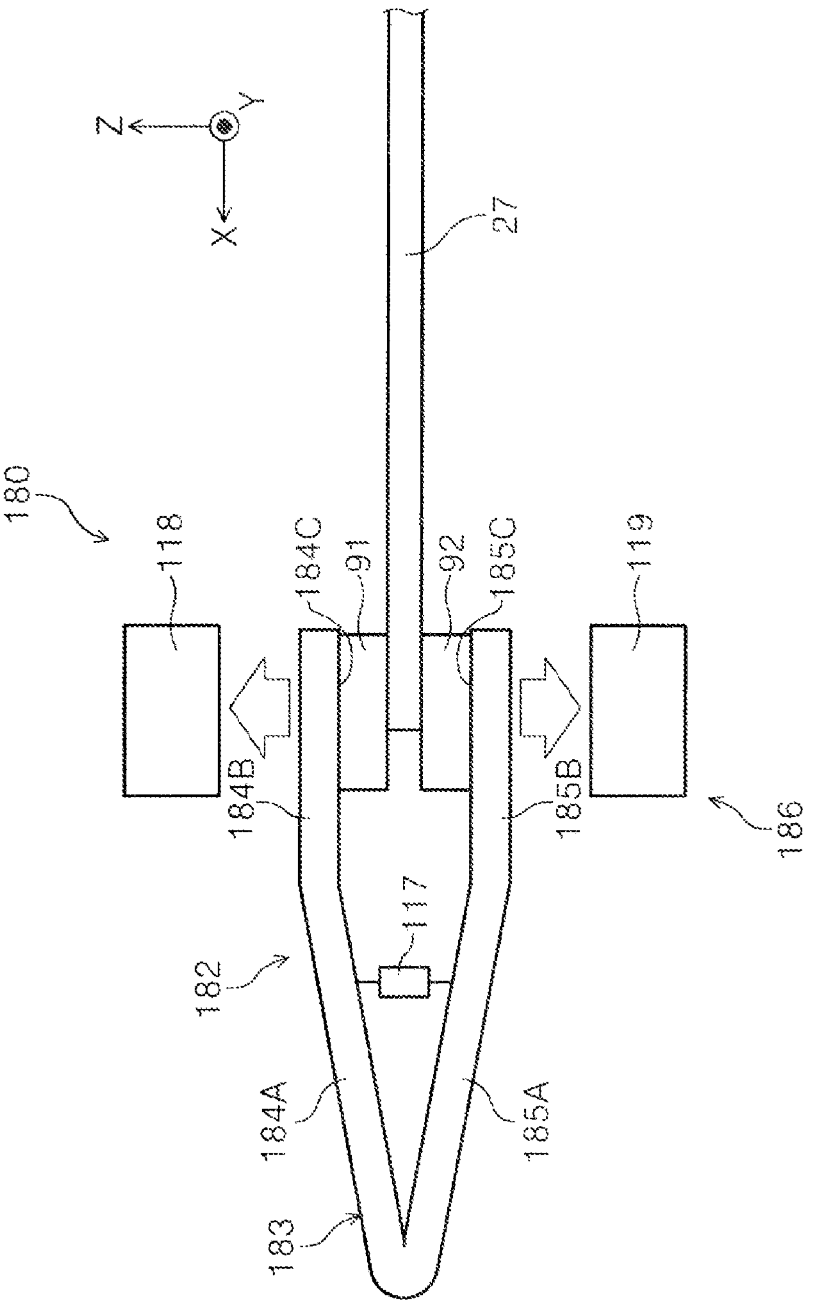
FIG. 19 is a schematic view illustrating a gripping unit of a printer according to a ninth exemplary embodiment.

FIG. 19 illustrates a portion of the printer 180 of the ninth exemplary embodiment.

The printer 180 includes a gripping unit 182 in place of the gripping unit 50 in the printer 10. Other configurations are basically the same as those of the printer 10. In the gripping unit 182, an end portion on the +X direction side and an end portion on the −X direction side of the glue belt 27 are disposed symmetrically with respect to a center in the X direction. Therefore, one configuration will be described and description of the other will be omitted.

The gripping unit 182 includes the first abutting portion 91 and the second abutting portion 92, a supporting member 183, and a switching unit 186. Note that the gripping unit 182 also includes the reading head 36 and the supporting bracket 52, but the drawings and descriptions thereof are omitted.

The supporting member 183 includes a first arm portion 184A, a first attachment portion 184B, a second arm portion 185A, and a second attachment portion 185B, which are integrated.

The first arm portion 184A extends obliquely upward. The second arm portion 185A extends obliquely downward. An end portion of the first arm portion 184A on the +X direction side and an end portion of the second arm portion 185A on the +X direction side are coupled to each other.

The first attachment portion 184B extends in the −X direction from an end portion of the first arm portion 184A on the −X direction side. The first abutting portion 91 is attached to a lower surface 184C of the first attachment portion 184B on the −Z direction side.

The second attachment portion 185B extends in the −X direction from an end portion of the second arm portion 185A on the −X direction side. The second abutting portion 92 is attached to an upper surface 185C of the second attachment portion 185B on the +Z direction side.

The switching unit 186 includes the tension spring 117, the electromagnet 118, and the electromagnet 119.

The tension spring 117 couples the first arm portion 184A and the second arm portion 185A in the Z direction. Thus, the tension spring 117 exerts tensile forces on the first arm portion 184A and the second arm portion 185A in directions that bring the first arm portion 184A and the second arm portion 185A closer to each other. Note that a restoring force of the supporting member 183 may be used without use of the tension spring 117.

The electromagnet 118 is positioned in the +Z direction with respect to the first attachment portion 184B and, by being energized, attracts the first attachment portion 184B in the +Z direction.

The electromagnet 119 is positioned in the −Z direction with respect to the second attachment portion 185B and, by being energized, attracts the second attachment portion 185B in the −Z direction.

In the gripping unit 182, when the electromagnets 118, 119 are energized, the first attachment portion 184A is attracted in the +Z direction while resisting the tensile force of the tension spring 117, and the second attachment portion 185B is attracted in the −Z direction while resisting the tensile force of the tension spring 117. Thus, the first abutting portion 91 and the second abutting portion 92 are separated, thereby bringing the gripping unit 182 into the release state.

Further, in the gripping unit 182, when the electromagnets 118, 119 are not energized, the tensile force of the tension spring 117 acts, causing the first attachment portion 184B and the second attachment portion 185A to move closer to each other. Thus, the first abutting portion 91 and the second abutting portion 92 grip the glue belt 27, thereby bringing the gripping unit 182 into the gripping state.

According to the printer 180, the first abutting portion 91 and the second abutting portion 92 are separated from the glue belt 27 in the release state. Thus, when the gripping unit 182 in the release state is moved in the −Y direction by the return carriage 100, one of the first abutting portion 91 and the second abutting portion 92 remains in contact with the glue belt 27 and no longer moves in the −Y direction, that is, the occurrence of friction in the glue belt 27 is suppressed, making it possible to suppress a reduction in durability of the glue belt 27.

The printer 10 to the printer 180 according to the first exemplary embodiment to the ninth exemplary embodiment of the present disclosure are based on configurations such as described above. However, as a matter of course, modifications, omissions, and the like may be made to a partial configuration without departing from the gist of the disclosure of the present application. Hereinafter modified examples will be described.

Figure 20:
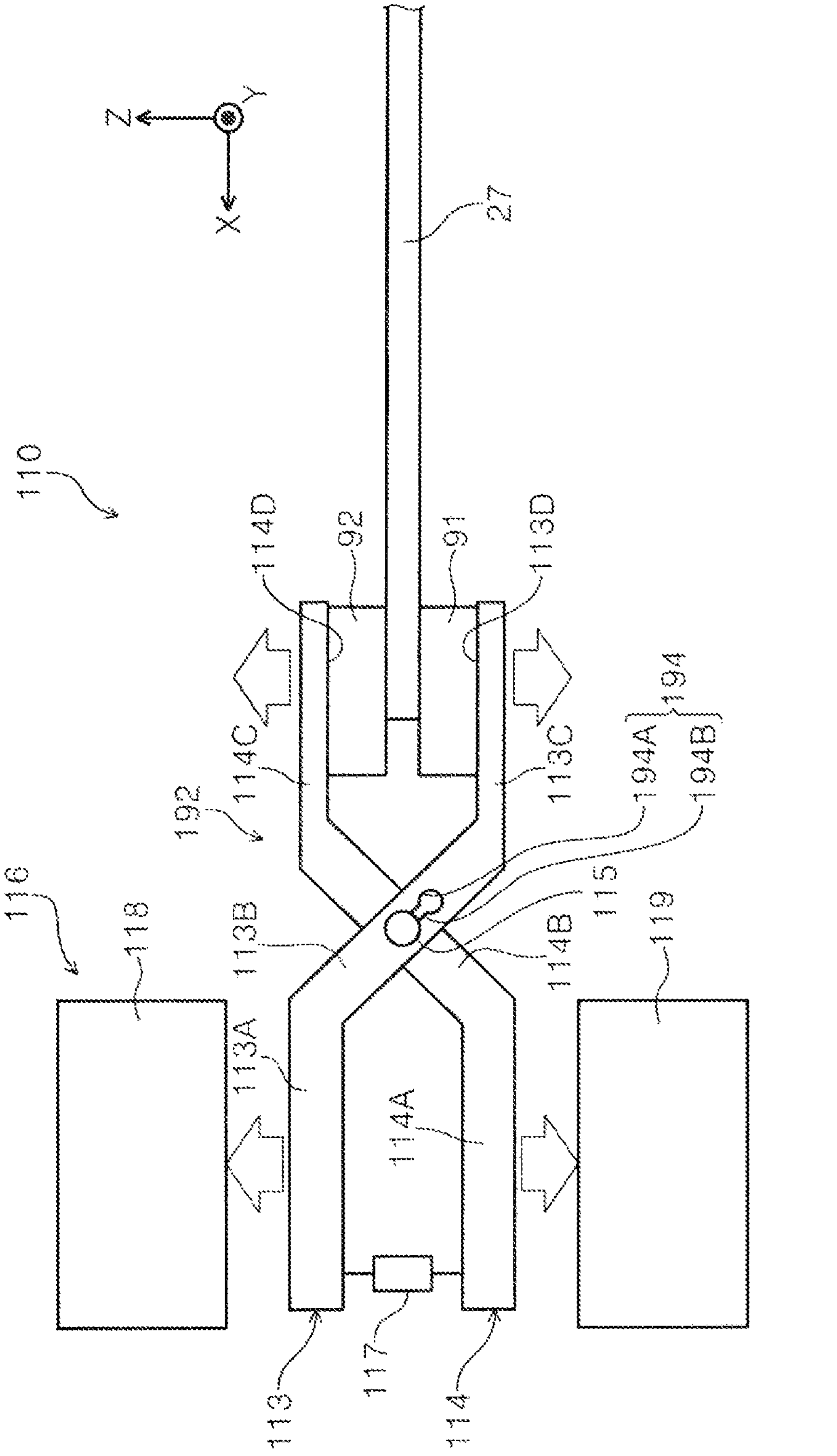
FIG. 20 is a schematic view illustrating a gripping unit of a modified example of the printer according to the second exemplary embodiment.

FIG. 20 illustrates a gripping unit 192 as a modified example of the gripping unit 112 in the printer 110 of the second exemplary embodiment.

The gripping unit 192 has a configuration similar to that of the second exemplary embodiment in that the inclined portion 114B is provided with the coupling pin 115, but differs from the configuration of the second exemplary embodiment in that a hole portion 194 is formed in the inclined portion 113B. Note that a shaft portion (not illustrated) having a flat shape is formed in the coupling pin 115.

The hole portion 194 includes two circular portions 194A that allow the coupling pin 115 to rotate, and a linear portion 194B that couples the two circular portions 194A. Note that one of the two circular portions 194A is omitted from the illustration.

A size of the circular portion 194A is such that the shaft portion of the coupling pin 115 can be inserted into and the coupling pin 115 does not pass through the circular portion 194A.

A size of the linear portion 194B is such that the shaft portion of the coupling pin 115 can be inserted into and the coupling pin 115 cannot be inserted into the linear portion 194B. In the linear portion 194B, the shaft portion of the coupling pin 115, when in a predetermined posture, can move from one circular portion 194A to the other circular portion 194A.

In the gripping unit 192, a change in the position of the coupling pin 115 changes distances from the coupling pin 115 serving as a fulcrum to the first abutting portion 91 and the second abutting portion 92. Thus, in the gripping unit 192, a gripping force by the first abutting portion 91 and the second abutting portion 92 is adjustable.

In the printer 10, the upper lever 86 may be constituted by a ferromagnetic material, and the electromagnet 72 may attract the upper lever 86, bringing the gripping unit 50 into the gripping state. Further, both the upper lever 86 and the lower lever 74 may be constituted by a ferromagnetic material, and the electromagnet 72 may attract the upper lever 86 and the lower lever 74, bringing the gripping unit 50 into the gripping state. Further, the upper lever 86 and the lower lever 74 may be coupled to different members.

Furthermore, the electromagnet 72 and the armature 84 may be brought into contact with each other.

In the printer 10, instead of the magnetic scale, the scale unit 34 may be changed to a scale that optically reads. Further, the read portion read by the reading head 36 may be provided to the gripping unit 50, and a reading unit corresponding to the reading head 36 may be provided on the supporting frame 14.

Further, the position of the supporting frame 14 in the Z direction may be fixed. Furthermore, the gripping unit 50 may be manually returned to the upstream position in the +Y direction without the return carriage 100 being driven.

As the buffer member, a member having elastic properties such as rubber may be used instead of the sponge 104. Further, the buffer member may also be provided to the gripping unit 50. Furthermore, the buffer member may be provided to both the return carriage 100 and the gripping unit 50.

The gripping unit 50 may be provided with the shock absorber 98.

Note that the configuration of the modified example of the printer 10 described above can be applied to the configuration of the printer 110 to the printer 180.

The medium is not limited to the fiber M, and may be paper or other sheet material.

The recording unit is not limited to performing recording using a serial type such as the recording head 22, and may perform recording using a line head type. Further, the recording unit may perform recording using an electrophotographic type.

The transporting belt is not limited to the glue belt 27, and may be a belt that does not adsorb the medium. Further, as the adsorption method of the medium on the transporting belt, various adsorption force expression mechanisms may be used in addition to the adsorption method described above, such as an electrostatic adsorption method using an electrostatic force generated by voltage application, a vacuum suction method using a compressor, and a molecular force method in which a plurality of minute protrusions are provided on the first surface 28. Further, the transporting belt may be constituted by an organic polymeric material such as silicone rubber or butyl rubber, and the medium may be adsorbed by the transport member due to the adhesiveness of the material itself. In other words, an adhesive need not be applied.

What is claimed is:

1. A recording device comprising:

a recording unit configured to perform recording on a medium;

a transporting belt including a first surface and a second surface and configured to transport the medium in a transport direction, the first surface being configured to support the medium, the second surface being opposite to the first surface in a thickness direction;

a scale unit including a scale and provided in the transport direction;

a reading unit configured to read the scale;

a gripping portion configured to move integrally with the scale unit or the reading unit, and to change between a gripping state of moving along with the transporting belt while gripping the transporting belt in the thickness direction, and a release state of being separated from the transporting belt, the gripping portion being brought into the gripping state at a first position in the transport direction, and brought into the release state at a second position downstream of the first position in the transport direction;

a guide member configured to guide the gripping portion in the transport direction;

a return unit configured to move the gripping portion in the release state in a reverse direction to the transport direction, wherein the gripping portion includes a first abutting portion configured to come into contact with the first surface in the gripping state, and a second abutting portion configured to come into contact with the second surface in the gripping state; a driving portion configured to drive the return unit; and when the gripping portion is in the release state, the second abutting portion is separated from the second surface in conjunction with the first abutting portion being separated from the first surface, the return unit being supported by the guide member and configured to be driven by the driving portion in the second position and thus move the gripping portion in the reverse direction; and wherein when the gripping portion is positioned in the second position, the return unit is separated from and positioned downstream of the gripping portion in the transport direction and at least one of the return unit and the gripping portion is provided with a buffer member configured to buffer an impact force generated by contact between the return unit and the gripping portion.

2. The recording device according to claim 1, comprising:

a switching unit configured to switch the gripping portion between the gripping state and the release state; a first support portion configured to support the first abutting portion; and a second support portion configured to support the second abutting portion, wherein at least one of the first support portion and the second support portion is constituted by a ferromagnetic material and the switching unit includes an electromagnet configured to generate an electromagnetic force when current flows, the switching unit being configured to switch the gripping portion from the release state to the gripping state by the electromagnet attracting at least one of the first support portion and the second support portion.

3. The recording device according to claim 2, comprising:

a coupling portion that includes a main body member to which each of the first support portion and the second support portion is rotatably coupled, the coupling portion being configured to couple the first support portion and the second support portion, wherein the main body member is provided with a permitting portion configured to permit displacement of the coupling portion with respect to the main body member.

4. The recording device according to claim 2, wherein at least one of the first support portion and the second support portion includes an attracted portion configured to be attracted by the electromagnet and the attracted portion is disposed below the electromagnet in a gravitational direction corresponding to a direction of gravity acting on the attracted portion, and is separated from the electromagnet in the gripping state.

5. The recording device according to claim 1, wherein the scale unit is a magnetic scale with a magnetic pattern recorded as the scale.

6. The recording device according to claim 1, wherein the gripping portion is supported by an adjustment unit configured to adjust a position of the gripping unit in a device height direction intersecting the transport direction.

7. The recording device according to claim 1, comprising:

a limiting portion configured to come into contact with the gripping portion and thus limit a movement range of the gripping portion in the transport direction, wherein at least one of the gripping portion and the limiting portion is provided with another buffer member configured to buffer an impact force generated by contact between the gripping portion and the limiting portion.

* * * * *